US010972592B2

(12) United States Patent
Song et al.

(10) Patent No.: US 10,972,592 B2
(45) Date of Patent: Apr. 6, 2021

(54) MOBILE TERMINAL

(71) Applicant: LG ELECTRONICS INC., Seoul (KR)

(72) Inventors: Insu Song, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/784,179

(22) Filed: Feb. 6, 2020

(65) Prior Publication Data

US 2020/0267247 A1 Aug. 20, 2020

Related U.S. Application Data

(60) Provisional application No. 62/805,920, filed on Feb. 14, 2019.

(30) Foreign Application Priority Data

Apr. 18, 2019 (KR) .................. 10-2019-0045543

(51) Int. Cl.
*H04M 1/02* (2006.01)
(52) U.S. Cl.
CPC ................. *H04M 1/0268* (2013.01)
(58) Field of Classification Search
CPC .. G06F 1/1624; G06F 1/1652; H04M 1/0237; H04M 1/0268; H04M 2250/22
See application file for complete search history.

(56) References Cited

U.S. PATENT DOCUMENTS

2012/0314400 A1* 12/2012 Bohn .................. H01L 51/5237
362/97.1
2014/0211399 A1 7/2014 O'Brien
(Continued)

FOREIGN PATENT DOCUMENTS

JP 2005309086 11/2005
KR 1020110082943 7/2011

OTHER PUBLICATIONS

PCT International Application No. PCT/KR2020/001411, International Search Report dated May 25, 2020, 10 pages.

*Primary Examiner* — Yuwen Pan
*Assistant Examiner* — Fatuma G Sherif
(74) *Attorney, Agent, or Firm* — Lee, Hong, Degerman, Kang & Waimey

(57) ABSTRACT

Disclosed is a mobile terminal having a flexible display unit. The present disclosure provides a mobile terminal including a first frame, a second frame coupled to the first frame movably and configured to move in a first direction against the first frame, a third frame coupled to the second frame movably and configured to move in the first direction against the second frame, a flexible display unit including a first region disposed on a front side of the mobile terminal and coupled to the first frame, a second region disposed on a backside of the mobile terminal and coupled to the third frame, and a third region elongated between the first and second regions, wherein the third region is disposed on the front side or backside of the mobile terminal selectively according to a moving direction of the second frame by being rolled around the second frame, and a drive unit configured to move the second frame in the first direction against the first frame and move the third frame in the first direction against the second frame.

20 Claims, 15 Drawing Sheets

(56) References Cited

U.S. PATENT DOCUMENTS

| | | | |
|---|---|---|---|
| 2016/0316575 A1 | 10/2016 | Lee | |
| 2017/0038798 A1* | 2/2017 | Lee | G06F 1/1616 |
| 2017/0064847 A1 | 3/2017 | Lim | |
| 2017/0139442 A1* | 5/2017 | Yoshizumi | G06F 1/1641 |
| 2018/0077808 A1* | 3/2018 | Seo | H05K 1/144 |

* cited by examiner

FIG. 3
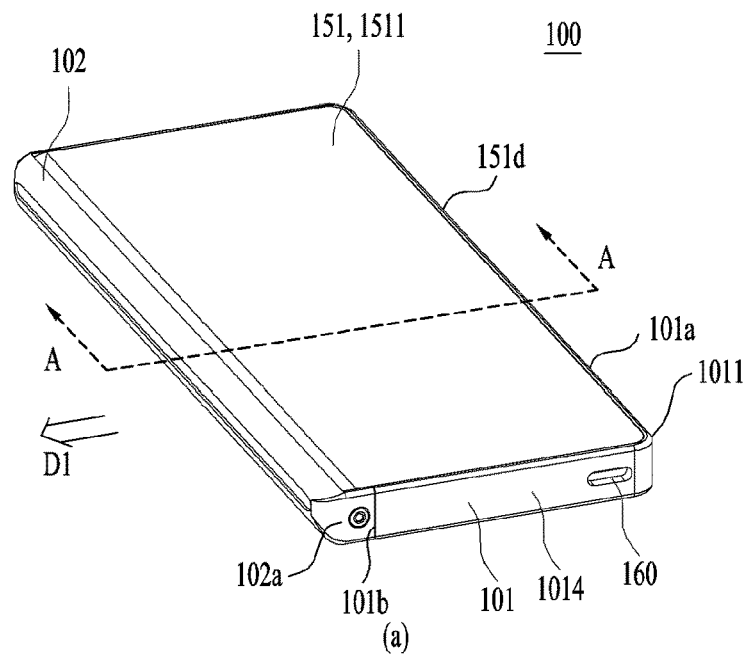
(a)
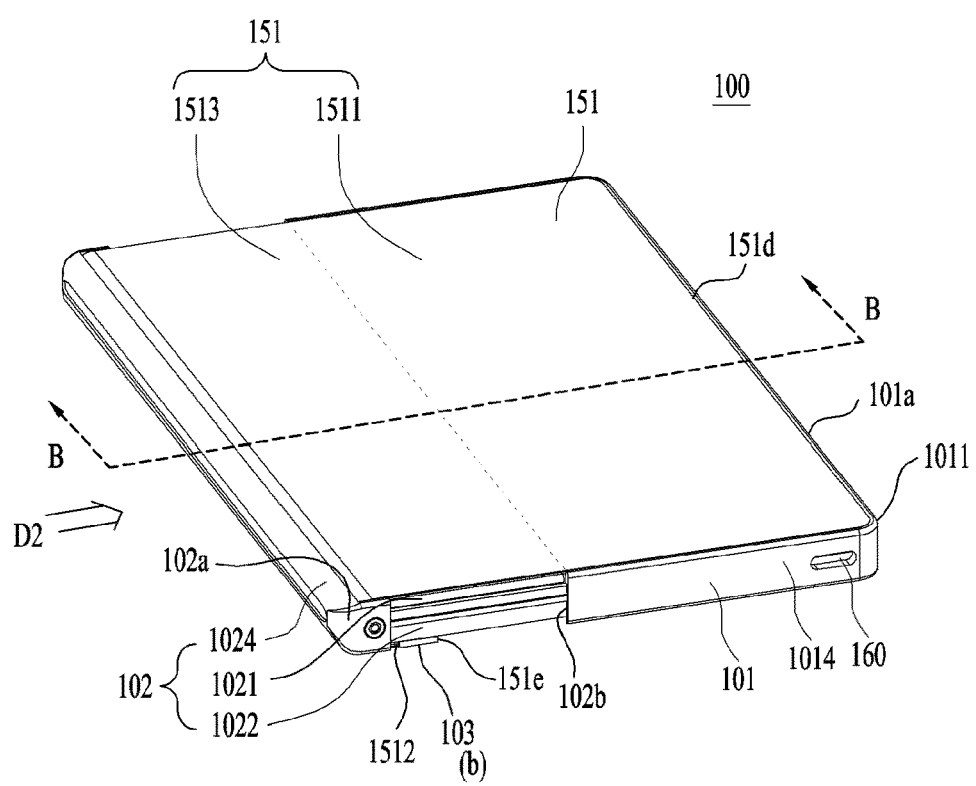
(b)

FIG. 4
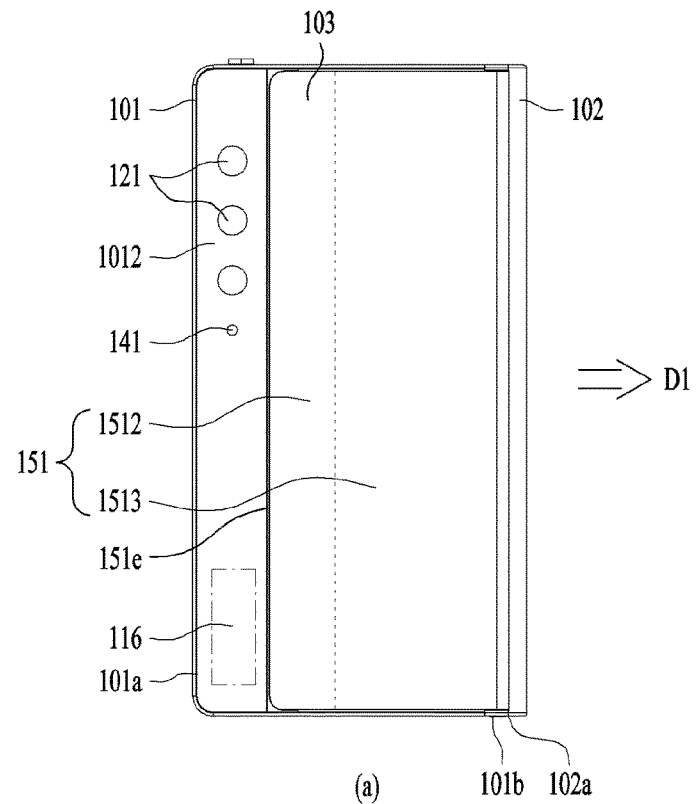
(a)
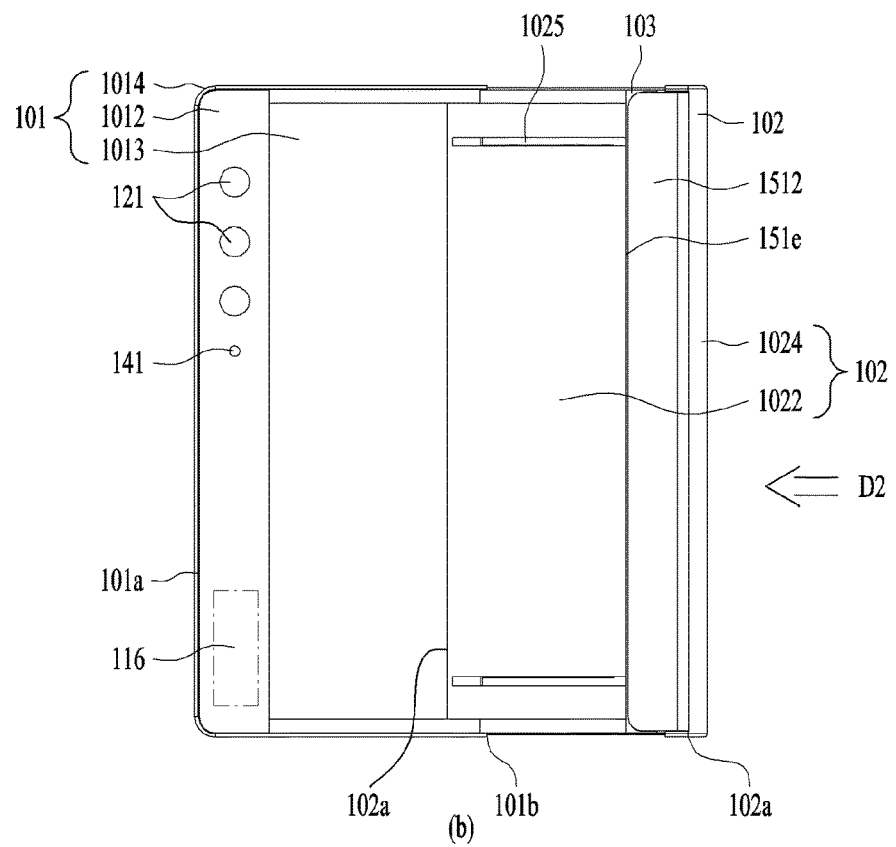
(b)

(a)            (b)

FIG. 7
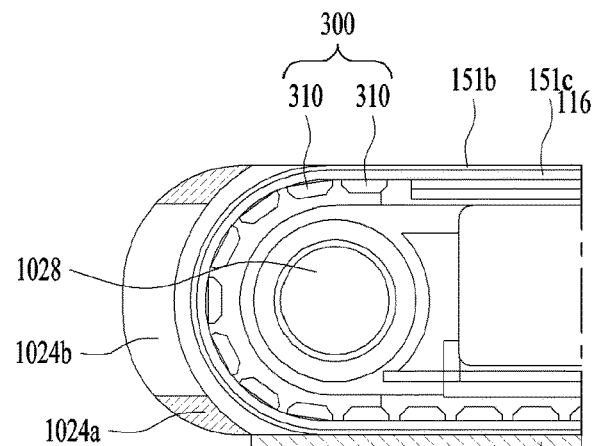
(a)
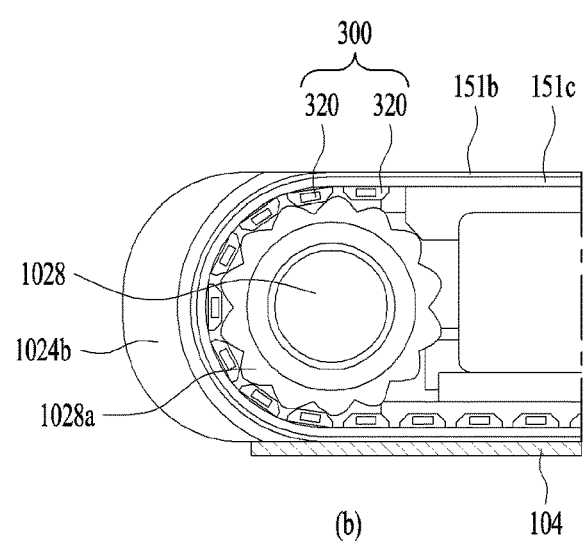
(b)
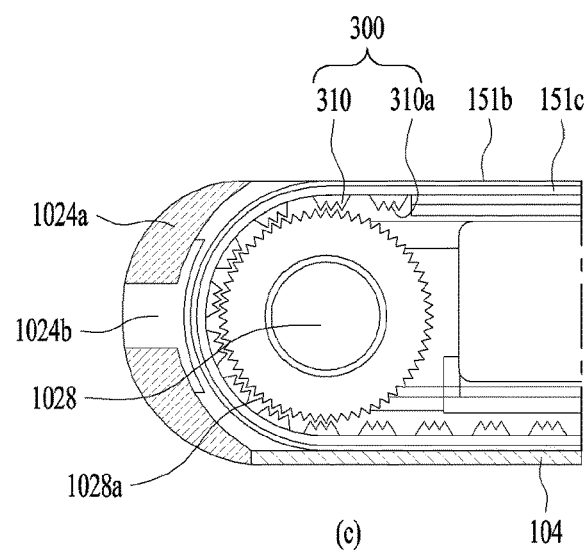
(c)

FIG. 9
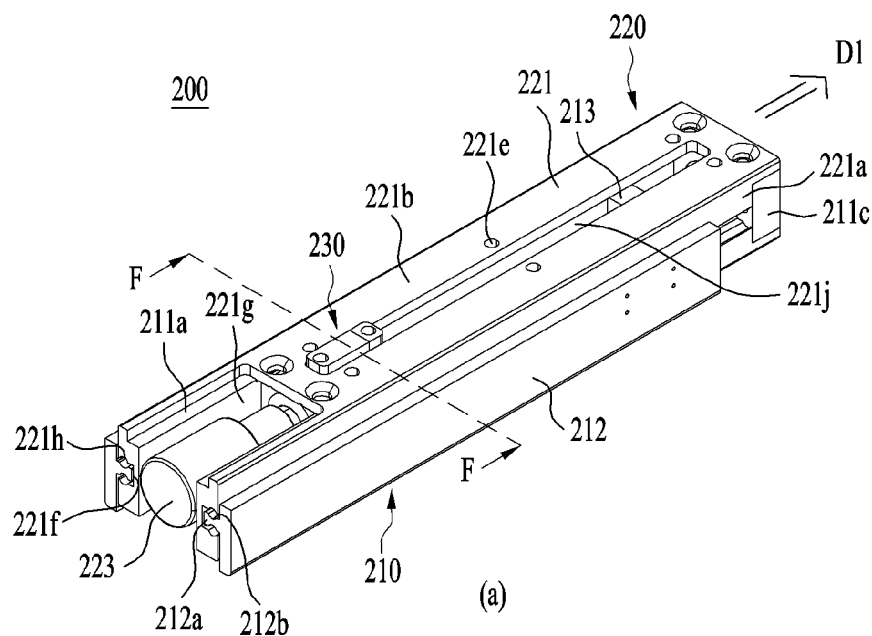
(a)
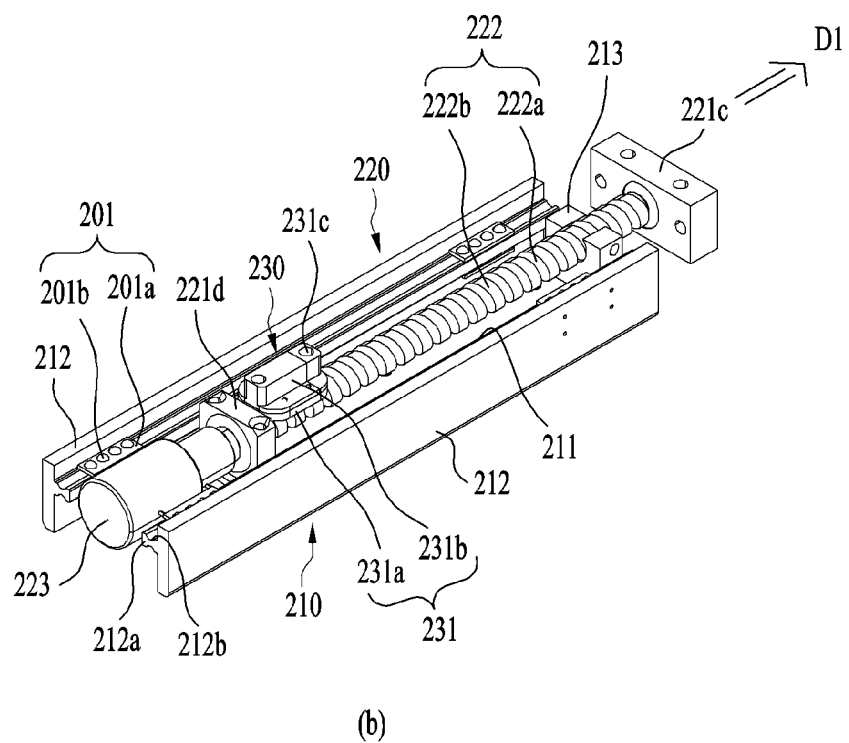
(b)

MOBILE TERMINAL

CROSS-REFERENCE TO RELATED APPLICATIONS

Pursuant to 35 U.S.C. § 119, this application claims the benefit of U.S. Provisional Application No. 62/805,920, filed on Feb. 14, 2019, and also claims the benefit of earlier filing date and right of priority to Korean Application No. 10-2019-0045543, filed on Apr. 18, 2019, the contents of which are all incorporated by reference herein in their entirety.

BACKGROUND OF THE DISCLOSURE

Field of the Disclosure

The present disclosure relates to a mobile terminal, and more particularly, to a mobile terminal capable of enlarging a size of a screen with a flexible display.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal Recently, functions of the mobile terminal have been considerably diversified owing to the developments of the broadcasting technology and the network technology, and performance of the mobile terminal has been correspondingly improved. In particular, the mobile terminal has been developed to provide a user with various contents as well as with a simply broadcasted content. For instance, the mobile terminal can provide not only programs received from a broadcasting station but also game plays, music listening, internet shopping, user-customized information and the like using various applications. In order to perform the extended functions, the mobile terminal is basically connected to other devices or networks using various communication protocols and can provide a user with ubiquitous computing. In particular, a mobile terminal has been evolved into a smart device that enables the connectivity to networks and the ubiquitous computing.

Meanwhile, a flexible display capable of considerable deformation with sufficient elasticity has been developed recently. Such a flexible display can be deformed enough to be rolled up into a body of the mobile terminal. The mobile terminal is capable of accommodating a rolled-up flexible display and projecting the display in a desired size out of its body. Hence, using the flexible display, the mobile terminal can have a compacter structure and a display extendable in a desired size. Thus, the mobile terminal needs to be improved in structural and functional aspects to maximize the advantages attributed to the flexible display.

SUMMARY OF THE DISCLOSURE

Accordingly, embodiments of the present disclosure are directed to a mobile terminal that substantially obviates one or more problems due to limitations and disadvantages of the related art.

One object of the present disclosure is to provide a mobile terminal, by which durability of a flexible display unit can be enhanced in a manner of non-limiting a folded point of the flexible display unit to a specific position.

Another object of the present disclosure is to provide a mobile terminal including a support structure of a flexible display unit, by which the flexible display unit can be stably supported when extended.

Further object of the present disclosure is to provide a mobile terminal, by which a flexible display unit is prevented from being broken or damaged by external shock on a lateral side having the flexible display unit folded thereon.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a mobile terminal according to one embodiment of the present disclosure may include a first frame, a second frame coupled to the first frame movably and configured to move in a first direction against the first frame, a third frame coupled to the second frame movably and configured to move in the first direction against the second frame, a flexible display unit including a first region disposed on a front side of the mobile terminal and coupled to the first frame, a second region disposed on a backside of the mobile terminal and coupled to the third frame, and a third region elongated between the first and second regions, wherein the third region may be disposed on the front side or backside of the mobile terminal selectively according to a moving direction of the second frame by being rolled around the second frame, and a drive unit configured to move the second frame in the first direction against the first frame and move the third frame in the first direction against the second frame, wherein the second frame may switch the mobile terminal from a first state to a second state by moving in the first direction, wherein the first state may be configured to expose only the first region of the flexible display unit to the front side of the mobile terminal, wherein the second state may be configured to withdraw the third region to the front side of the mobile terminal from the second frame according to a movement of the second frame in the first direction, and wherein the drive unit may be configured to synchronize a movement of the third frame with a slide of the second frame.

The second frame and the third frame may be configured to move in a second direction opposite to the first direction and wherein the second frame may be configured to switch the mobile terminal to the first state from the second state by moving in the second direction and retract the withdrawn third region to the second frame from the front side of the mobile terminal so as to expose only the first region to a front side of the first frame.

The drive unit may be configured to synchronize a location for the third frame to start to move with a location for the second frame to start to move. The drive unit may be configured to synchronize a timing point for the third frame to start to move with a timing point for the second frame to start to move. And, the drive unit may be configured to synchronize a moving speed of the third frame with a moving speed of the second frame.

Preferably, the drive unit may include a supporter coupled to the first frame, a first actuator coupled to the supporter so as to be movable in the first direction, the first actuator coupled to the second frame, and a second actuator coupled to the first actuator so as to be movable in the first direction, the second actuator coupled to the third frame.

The drive unit may be configured to synchronize a movement of the second actuator with a movement of the third actuator.

The supporter may include sidewalls configured to confront both sides of the first actuator and support a movement of the first actuator.

The first actuator may be configured to be thread-coupled to the supporter and moved by a rotation of a first rotation direction thereof in the first direction against the supporter.

Preferably, the first actuator may include a first housing movably coupled to the supporter and a thruster installed rotatably within the first housing and thread-coupled to the supporter, and the thruster may be configured to thrust the first actuator in the first direction relatively to the supporter by a rotation of a first rotation direction thereof.

The thruster may include a body elongated long and a screw gear having a thread formed on an outer surface of the body and the first actuator may further include a motor configured to rotate the thruster by being disposed within the first housing. And, the first actuator may further include a guide slot formed along a length direction thereof and guiding a motion of the second actuator by receiving the second actuator therein.

The drive unit may include a guide configured to guide a movement of the first actuator against the supporter and the guide may include a rail protruding from the supporter toward the first actuator and elongated in a length direction of the supporter and a recess formed on the first actuator along a length direction thereof and configured to receive the rail therein. And, the guide may further include a retainer interposed between confronted surfaces of the recess and rail and a bearing received in the retainer and contacting with the surfaces of the recess and rail.

The second actuator may be thread-coupled to the first actuator and configured to be moved in the first direction by the rotation of the first rotation direction of the first actuator.

The thruster may be configured to move the first and second actuators simultaneously by rotating in the first rotation direction. And, the thruster may be thread-coupled to the supporter and the second actuator.

Preferably, the second actuator may include a second housing movably coupled to the first actuator and a sub-thruster rotatably disposed within the second housing and thread-coupled to the thruster, wherein the sub-thruster may be configured to rotate in a second rotation direction counter to the first rotation direction by a rotation of the first rotation direction of the thruster and thrust the second actuator in the first direction by the rotation of the second rotation direction.

And, a thread of the sub-thruster may have a same rolling direction of a thread of the thruster.

Accordingly, the present disclosure may provide the following effects and/or advantages.

First of all, a mobile terminal of the present disclosure non-limits a flexible display unit folded point to a specific position, thereby enhancing durability of the flexible display unit.

Secondly, when a flexible display unit is extended (or enlarged), it can be stably supported, whereby difficulty in applying a touch input and the like can be minimized.

Thirdly, a flexible display unit is prevented from being broken or damaged by external shock on a lateral side having the flexible display unit folded thereon.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The embodiments will be described in detail with reference to the following drawings in which like reference numerals refer to like elements wherein:

FIG. 3 is a perspective view showing first and second states of a mobile terminal viewed in one lateral side;

FIG. 4 is a backside view showing first and second states of a mobile terminal;

FIG. 7 is a cross-sectional view showing side frames obtained along the cutting lines C-C, D-D and E-E of FIG. 6, respectively;

FIG. 9 is a perspective view showing a drive unit in a first state;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
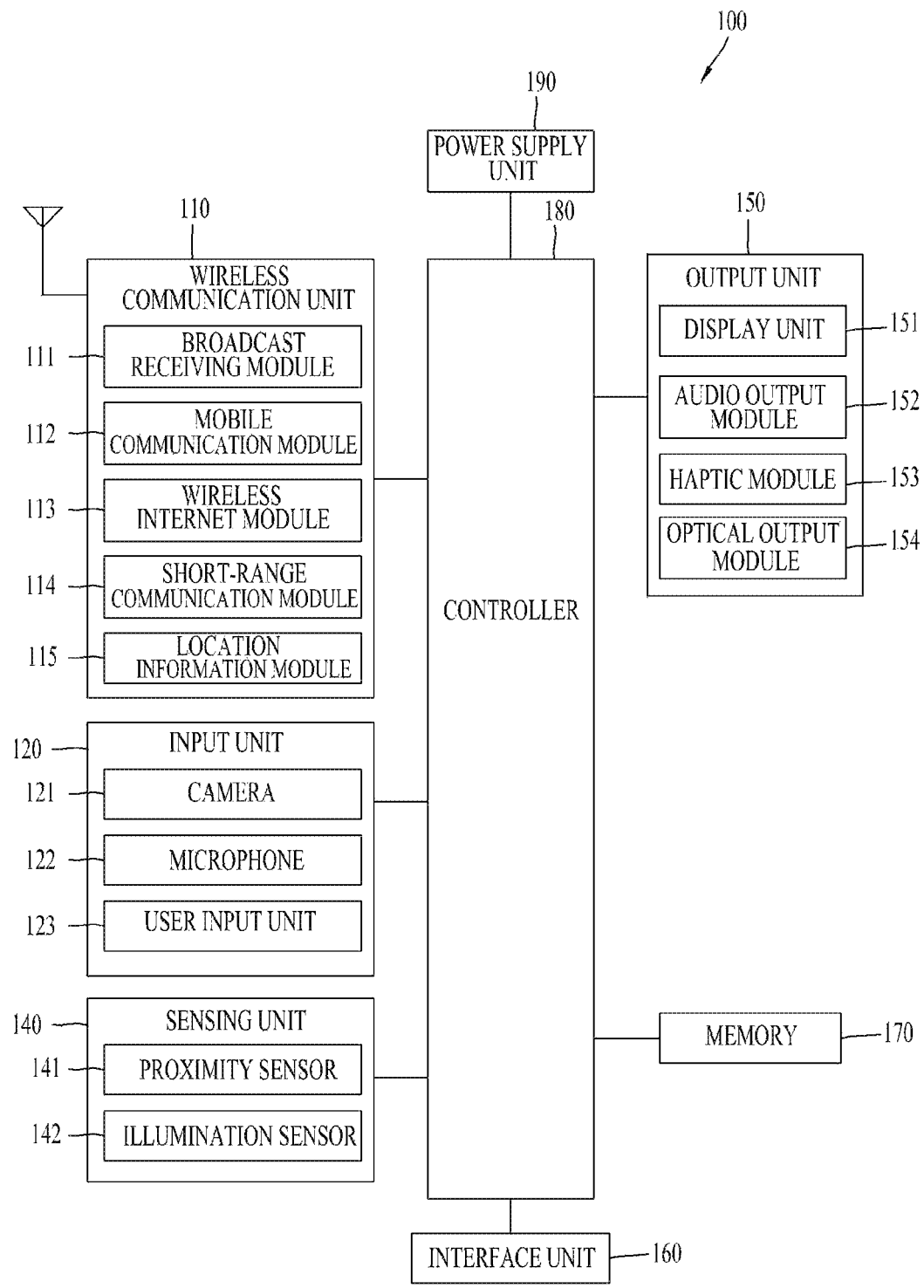
FIG. 1 is a block diagram showing an overall configuration of a mobile terminal according to the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
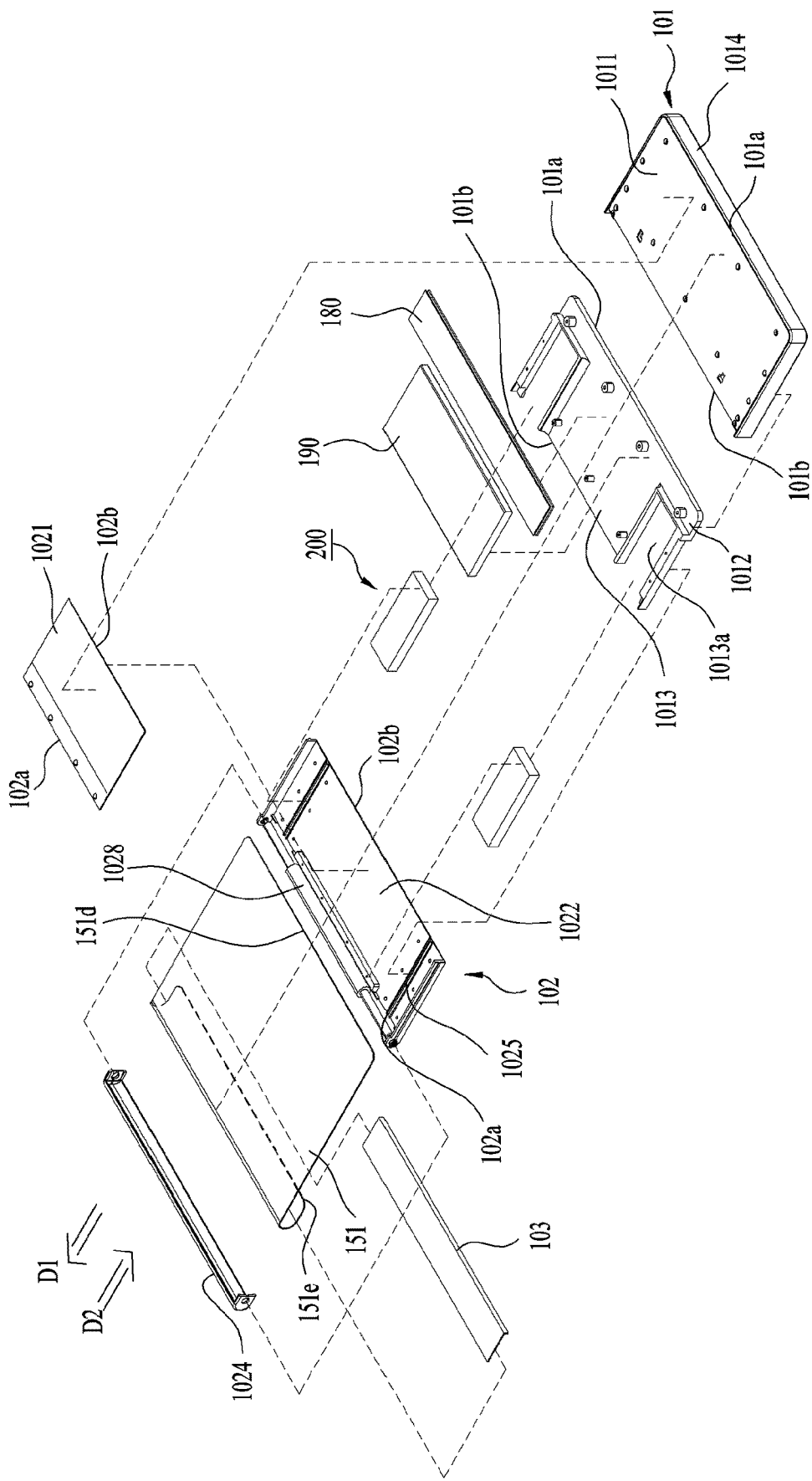
FIG. 2 is an exploded perspective view showing a mobile terminal according to the present disclosure.
Figure 5:
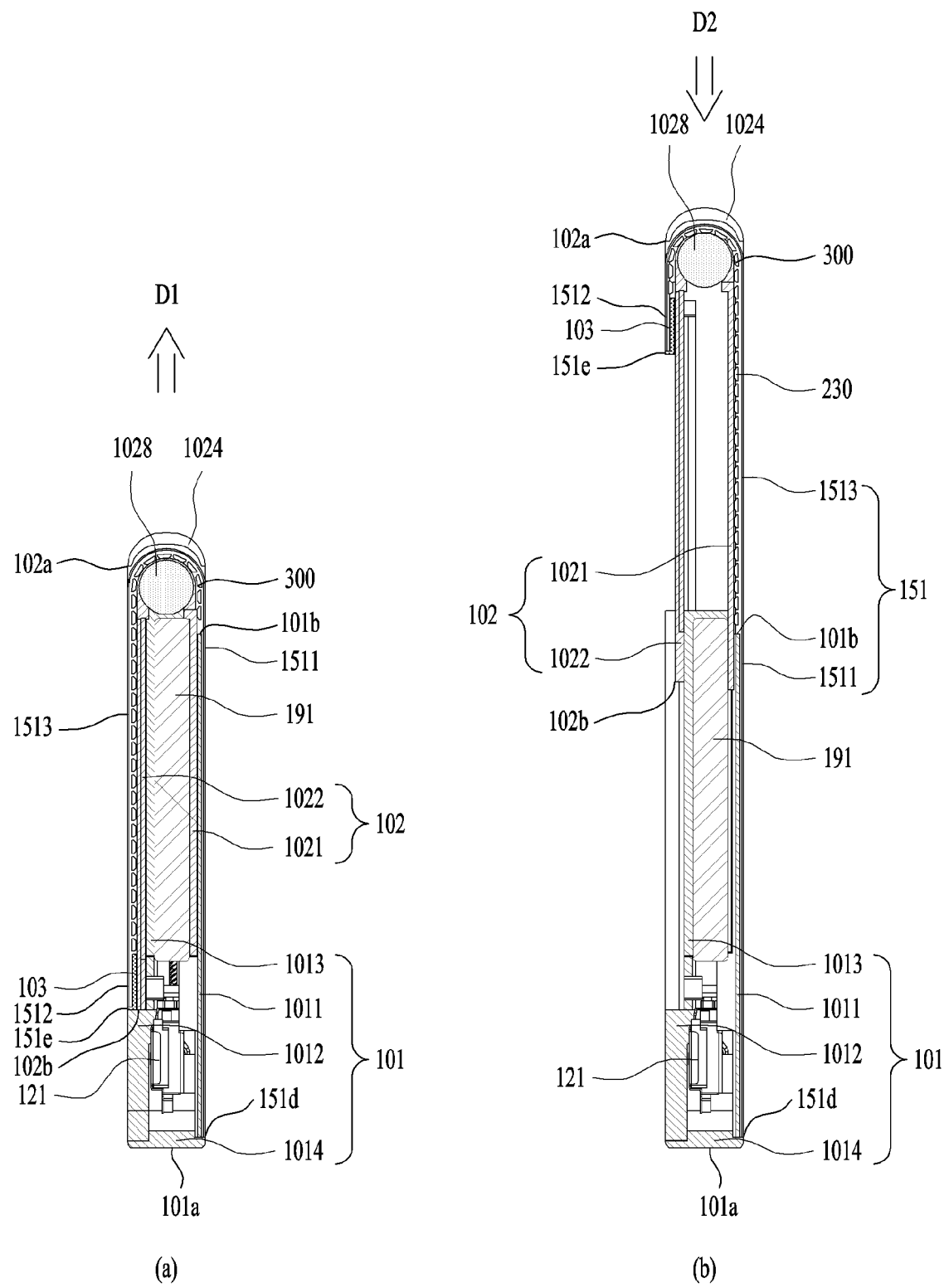
FIG. 5 is a cross-sectional view showing first and second states of a mobile terminal, obtained along the cutting lines A-A and B-B of FIG. 2, respectively.

FIG. 2 is an exploded perspective view showing a mobile terminal according to the present disclosure. FIG. 3 is a perspective view showing first and second states of a mobile terminal viewed in one lateral side. FIG. 4 is a backside view showing first and second states of a mobile terminal. FIG. 5 is a cross-sectional view showing first and second states of a mobile terminal, obtained along the cutting lines A-A and B-B of FIG. 2, respectively. In the above drawings, FIG. 3(a), FIG. 4(a) and FIG. 5(a) show a first state of a mobile terminal and FIG. 3(b), FIG. 4(b) and FIG. 5(b) show a second state of the mobile terminal.

As shown in the drawings, a mobile terminal 100 of a first state is contracted (or retracted) and has a size smaller than that of the mobile terminal 100 of a second state. Moreover, a size of a display 151 located on a front side of the mobile terminal 100 becomes smaller than that in a second state. On the other hand, the mobile terminal 100 of the first state is extended in a first direction D1 so as to switch to the second state. In the second state, a size of the mobile terminal 100 and a size of the display 151 located on the front side become greater than those of the first state. In the following description, a direction in which the mobile terminal 100 and the display 151 thereof are extended (or enlarged) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front side like a bar-type mobile terminal like FIG. 3(a) to the second state by extending the screen like FIG. 3(b). In the second state, a size of the display 151 located on the front side is enlarged and a size of the display 151 located on a backside is reduced like FIG. 4(b). Namely, the display 151 used to be located on the backside of the mobile terminal 100 in the first state is moved to the front side of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As shown in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

Meanwhile, a deformation sensing means for sensing deformation of the flexible display unit 151 may be provided to the mobile terminal 100. Such a deformation sensing means may be included in the sensing unit 140 (see FIG. 1).

The deformation sensing means is provided to the flexible display unit 151 or the case (or housing) (i.e., first to third frame 101 to 103 described later), thereby sensing information related to deformation of the flexible display unit 151. Here, the information related to the deformation includes a deformed direction of the flexible display unit 151, a deformed extent, a deformed position, a deformed time, a restored acceleration of the deformed flexible display unit 151, etc., and may further various kinds of information sensible as the flexible display unit 151 is curved.

Based on the information related to the deformation of the flexible display unit 151 and sensed by the deformation sensing means, the controller 180 may change information displayed on the flexible display unit 151 or generate a control signal for controlling a function of the mobile terminal 100.

The size changes of the display unit 151 on the front and rear sides of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a drive unit 200 described later.

The flexible display unit 151 of the present disclosure is rolled round a prescribed one of both side parts of the mobile terminal 100, thereby being folded at 180°. Hence, one portion of the display unit 151 is disposed on the front side of the mobile terminal 100 with reference to such a side part, while the rest is disposed on the backside of the mobile terminal 100. Some portion of the display unit 151 located on the front side of the mobile terminal 100 may be fixed to the front side not to move, while the rest of the display unit 151 located on the backside of the mobile terminal 100 may be provided to be movable on the backside. The display unit 151 may be rolled or unrolled round the side part, whereby a size of the region disposed on the front side of the mobile terminal 100 may be adjusted by moving a part of the display unit 151 disposed on the backside of the mobile terminal 100. Since a size of the flexible display unit 151 is determined and the flexible display unit 151 includes a single continuous body, if a size of the flexible display unit 151 located on the front side of the mobile terminal 100 is increased, a size of the flexible display unit 151 located on the backside of the mobile terminal 100 is decreased. The above-configured display unit 151 may be rolled within the second frame 102 relatively movable to the first frame 101, which will be described later, and more specifically, around a prescribed side part of the second frame 102, and withdrawn (or pulled out) from or inserted (or pushed) into the second frame 102 by being rolled around the second frame 102 along a moving direction of the second frame 102 to adjust the size of the display unit 151 on the front side of the mobile terminal 100. Such an operation will be described in detail together with other related components of the mobile terminal 100.

Typically, an antenna is provided to the case of housing of the mobile terminal 100. Yet, an antenna installed portion of the case or housing may be restricted by the flexible display unit 151 that covers the front side of the mobile terminal 100 up to the backside. For that reason, an antenna may be implemented on the flexible display unit 151. An Antenna On Display (AOD) includes an antenna configured in a manner of forming a transparent film with patterned electrode layers and dielectric layers laid one upon another. As the AOD can be implemented thinner than Laser Direct Structuring (LDS) with Cu—Ni plating, it barely affects thickness and does not come into view, advantageously. And, the AOD may directly transceive signals with the display unit 151. Therefore, the AOD is available for the mobile terminal 100 having the display unit 151 located on both sides thereof.

Specific configuration of the mobile terminal 100 of the present disclosure is described in detail with reference to FIGS. 2 to 5 as follows. In the following description, FIG. 2 showing the overall configuration is referred to basically and FIGS. 3 to 5 are referred to describe the specific features of the corresponding components in the first and second states of the mobile terminal 100.

The mobile terminal 100 of the present disclosure may include a first frame 101, a second frame 102 moving in a first direction against the first frame 101, and a third frame 103 moving in the first direction against the second frame 102. The first and second frames 101 and 102 include a front part, a rear part and a lateral part, which are coupled together. Therefore, the mobile terminal 100 may form a hexahedral exterior with the coupled first and second frames 101 and 102. Considering the configuration of the illustrated first to third frames 101 to 103, movement of the second and third frames 102 and 103 may become slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as shown in FIG. 2 and FIG. 5, the first frame 101 may include a first front part 1011 disposed on the front side of the mobile terminal 100 and first and second rear parts 1011 and 1012 disposed on the rear side of the mobile terminal 100. Each of the first front part 1011, the first rear part 1012 and the second rear part 1013 may include an approximately flat plate-type member. The first rear part 1012 and the second rear part 1013 may include separate members coupled together or a single member shown in the drawing. In order to form a prescribed space, the first font part 1011 and the first/second rear part 1012/1013 may be spaced apart from each other in a prescribed gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the drive unit 200 described alter may be received in the first frame 101 as well.

As described above, the display unit 151 has the continuous body and may be disposed on both of the front and rear sides of the mobile terminal 100 by being rolled up within the mobile terminal 100. Hence, a portion of the display unit 151 may be disposed on the first front part 1011 corresponding to the front side of the mobile terminal 100 and the rest may be disposed on the first and second rear parts 1012 and 1013 corresponding to the rear side of the mobile terminal 100, simultaneously. On the other hand, as well shown in FIG. 4, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front side of the terminal only. Hence, a camera is disposed on a backside of the terminal in order to capture an image by viewing a thing located at the opposite side of a user through a display unit. In order for the user to capture himself by viewing himself through the display unit, an additional camera needs to be provided to the front side of the terminal. Yet, according to the mobile terminal 100 of the present disclosure, the display unit 151 is located on both of the front and rear sides thereof. Therefore, when a user takes a selfie, the display unit located on the same side of the camera 121, i.e., a portion of the display unit 151 located on the backside of the mobile terminal 100 in the drawing may be used. When a thing at the opposite side of the user is captured, the display unit located on the opposite side of the camera 121, i.e., a portion of the display unit 151 on the front side of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well shown in FIG. 2, for example, since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

Referring to FIG. 2, the second frame 102 may include a second front part 1021 disposed on the front side of the mobile terminal 100 and a third rear part 1022 disposed on the rear side of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear sides of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear sides of the mobile terminal 100 to provide a user with a screen of a good quality. For such a spread, an appropriate tension should be provided to the display 151. In order to provide the appropriate tension, the roller 1028 may be preferably located distant from the first side part 101a of the first frame 101 adjacent to a side edge (or a side end) (i.e., a side end 151d in the drawing) of the display 151. As shown in FIG. 2, the second frame 102 includes two first and second side parts 102a and 102b confronting each other, and the first side part 102a may be located farther than the second side part 102b from the first frame, and more specifically, the first side part 101a of the first frame. For that reason, the roller 1028 may be disposed on the first side part 102a of the second frame 102 confronting the first side part 101a of the first frame 101. The roller 1028 may be elongated in a length direction of the mobile terminal 100, i.e., a length direction of the second frame 102, and coupled to the second frame 102, and more specifically, to top and bottom sides of the third rear part 1022. The display unit 151 may be rolled around the roller 1028 by being gradually curved with a prescribed curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear side of the mobile terminal 100 relatively to the second frame 102 in a different direction (i.e., the first direction D1 or the second direction D2). In doing so, such a movement may be guided by the roller 1028 that is rotating.

Moreover, the roller 1028 is disposed on the first side part 102a of the second frame 102, and the first side part 102a substantially corresponds to a most outer side part of the mobile terminal 100. If the first side part 102a of the second frame 102 is exposed, the display unit 151 rolled around the roller 1028 may be broken or damaged. Hence, the second frame 102 may include a side frame 1024 disposed on the first side part 102a. The side frame 1024 may be elongated long in a length direction of the second frame 102 so as to cover the first side part 102a, thereby protecting the roller 1028 and the display unit 151 rolled around the roller 1028. By the side frame 1024, the second frame 102 may have the first side part 102a that is substantially closed. And, the side frame 1024 may substantially form an exterior of the mobile terminal 100 together with the lateral part 1014 of the first frame 101. Moreover, in order to minimize the interference with the parts within the frame 101 in the course of moving, the second frame 102 may include a second side part 102b disposed to confront the first side part 102a and configured open.

The above-configured second frame 102 is movably coupled to the first frame 101, thereby being configured to slide in a prescribed first or second direction D1 or D2 against the first frame 101. Specifically, as shown in the drawing, the second frame 102 may be movably coupled to the first frame 101 through the side part of the first frame 101, and more particularly, through the open second side part 101b. More specifically, the second side part 102b of the second frame 102 is disposed relatively adjacent to the closed first side part 101a of the first fame 101, whereby the first side part 102a of the second frame 102 may be disposed to control the first side part 101a. Therefore, the second side part 102b is inserted into the first frame 101 through the side part of the first frame 101, i.e., the second side part 10b thereof. The first side part 102b is not inserted into the first frame 101 but is always located outside the first frame 101, thereby forming the exterior of the mobile terminal 100 as described above. Yet, if necessary, the first side part 102b of the second frame 102 may be inserted into the first frame 101.

Owing to the above location relation, the second frame 102 may be enlarged or contracted from the first frame in a direction vertical to a length direction of the mobile terminal 100 or the first frame 101. Namely, each of the first and second directions D1 and D2 may be a direction vertical to a length direction of the mobile terminal 100 or the first frame 101 basically. On the other hand, each of the first and second directions D1 and D2 may be explained as a lateral or horizontal direction of the mobile terminal 100 or the first frame 101. Moreover, in the movement of the first direction D1, the second frame 102 is extended from the first frame 101, whereby the first direction D1 may become a direction that the second frame 102 gets away from the first frame 101, i.e., a direction the second frame 102 moves outwardly from the mobile terminal or the first frame 101. On the other hand, in the movement of the second direction D2, the second frame is contracted toward the first frame 101. Hence, the second direction D2 is a direction confronting the first direction D1 and may become a direction that the second frame 102 gets closer to the first frame 101, i.e., a direction that the second frame 102 moves inwardly into the mobile terminal 100 or the first frame 101. When moving in the first direction D1, the second frame 102 is extended and applies a force to a portion of the display unit 151 used to be disposed on the backside of the mobile terminal 100 so as to dispose it on the front side of the mobile terminal 100 additionally, thereby forming a region for such an additional disposition. Therefore, the second frame 102 may switch the mobile terminal 100 to the second state of having a relatively extended front display 151 by the movement in the first direction D1. On the other hand, when moving in the second direction D2, the second frame 102 is contracted into the original state and applies a force to a portion of the display unit 151 used to be disposed on the front side of the mobile terminal 100 so as to return it to the rear side of the mobile terminal 100. Therefore, by the movement in the second direction D2, the second frame 102 may switch the mobile terminal 100 to the first state of having a relatively reduced front display unit 151. Thus, the second frame 102 selectively exposes the display unit 151 on the front side of the mobile terminal 100 according to the moving direction (i.e., the first direction D1 or the second direction D2), thereby switching the mobile terminal 100 to the above-defined first or second state.

In the course of the above-mentioned extension and contraction in the first and second directions D1 and D2, the second frame 102 may overlap with the first frame 101, and more specifically, with the first front part 1011, the first rear part 1012 and the second rear part 1013 of the first frame 101 so as not to interfere with the first frame 101. Particularly, as described above, the display unit 151 may be coupled by the first front part 1011 of the first frame 101 and then supported by it, thereby being unnecessary to be additionally supported by the second front part 1021 of the second frame 102. Instead, if the second front part 1021 is inserted between the first front part 1011 and the display unit 151, the display unit 151 may be deformed or broken by the friction with the second front part 1021 that is moving repeatedly. Hence, as well shown in FIG. 5, the second front part 1021 may be disposed below the first front part 1011. Namely, a front side of the second front part 1021 may confront a backside of the first front part 1011. Moreover, in order to stably support the movement of the second frame 102, the backside of the first front part 1011 may contact with the front side of the second front part 1021. As described above, a portion of the display unit 151 is moved to the front side and the backside of the mobile terminal 100 according to the moving direction D1 or D2 of the second frame 102. Hence, in order for the display unit 151 to move smoothly, it may be advantageous that the display unit 151 is configured to move together with the second frame 102 instead of the first frame 101 that is stopped relatively. In order to move by linking to the second frame 102, the display unit 151 may need to be coupled to the second frame 102. Hence, the third rear part 1022 of the second frame 102 may be disposed below the second rear part 1013 of the first frame 101. Namely, a front side of the third rear part 1022 may confront the backside of the second rear part. In order to stably support the movement of the second frame 102, the backside of the second rear part 1013 may contact with the front side of the third rear part 1022. By such disposition, the third rear part 1022 may be exposed from the first frame 101, and more exactly, from the second rear part 1013 and coupled to the display unit 151.

The second frame 102 may extend or reduce a size of the mobile terminal 100 itself, and more particularly, the front side of the mobile terminal 100 by the extension and contraction in the first and second directions D1 and D2, and the display unit 151 should move by the extended or reduced front side to obtain the intended first or second state. Yet, if the second frame 102 is fixed, the display unit 151 is unable to smoothly move to keep up with the extended or reduced front side of the mobile terminal 100. For that reason, the display unit 151 may be movably coupled to the second frame 102. Particularly, the display unit 151 may include a first side end (or edge) 151d disposed on the front side of the mobile terminal 100 and a second side end (or edge) 151e provided to the rear side of the mobile terminal 100 by confronting the first side end. The first side end 151d is disposed on the front side of the first frame 101, i.e., the front side of the first front part 1011 of the first fame 101 in a manner of being adjacent to the side part of the mobile terminal 100, i.e., the first side part 101a of the first frame 101. On the contrary, as the second side end 151e is adjacent to the backside of the mobile terminal 100, i.e., the third rear part 1022 of the second frame 102, it may be coupled to the third rear part 1022 of the second frame 102 so as to be movable in the first and second directions D1 and D2. Moreover, since the display 151 is not strong structurally, the third frame 103 may be coupled to the second side end 151e. The third frame 103 may include a panel member elongated long in the length direction of the mobile terminal 100. Hence, the third frame 103 may be coupled to the second frame 102, i.e., the third rear part 1022 thereof instead of the second side end 151e so as to be movable in the first and second directions D1 and D2. The second frame 102 may include a slot 1025 elongated in a lateral direction of the mobile terminal 100 or the second frame 102, i.e., a direction vertical to the length direction thereof, and the third frame 103 may stably move by being guided by the slot 1025. The third frame 103 may include a protrusion inserted in the slot 1025 for example for the movement along the slot 1025.

Referring to FIGS. 3 to 5, in association with the above configurations of the first to third frames 103, the display unit 151 may include a first region 1511 elongated in a prescribed length from one side of the display unit 151, i.e., the first side end 151d toward the confronted second side end 151e and a second region 1512 disposed to confront the first region 1511 and elongated in a prescribed length from the second side end 151e toward the first side end 151d. And, the display unit 151 may include a third region 1513 disposed between the first region 1511 and the second region 1512. The first to third regions 1511 to 1513 are connected to one another and may form a continuous body of the display unit 151. As described above, for the movement to the front or rear side of the mobile terminal 100 of the third region 1513 according to the moving direction of the second frame 102, the first region 1511 may be fixed to the front side of the mobile terminal 100 so as not to be movable and the second region 1512 may be movably provided to the rear side of the mobile terminal 100. Such a configuration of the display unit 151 is described in detail as follows.

The first region 1511 may be disposed on the front side of the mobile terminal 100, and more particularly, to the front side of the first front part 1011. The first region 1511 is fixed to the first frame 101, i.e., the front side of the first front part 1011 so as not to move in the course of the movement of the second frame 102, thereby being always exposed to the front side of the mobile terminal 100. The third region 1513 is adjacent to the first region 1511 and may be rolled around the roller 1028 by extending into the second frame 102. The third region 1513 may continuously extend out of the second frame 102 so as to cover the second frame 102, i.e., the backside of the third rear part 1022 in part. On the other hand, the second frame 102, i.e., the third rear part 1022 is adjacent to the first frame 101, i.e., the second rear part 1013 so as to form the rear case of the mobile terminal 100 together, whereby the third region 1513 may be described as disposed on the backside of the first frame 101 as well.

The second region 1512 is adjacent to the third region 1513 and may be disposed on the backside of the mobile terminal 100, and more particularly, to the second frame 102, i.e., the backside of the third rear part 1022 thereof. Namely, the second region 1512 may be coupled not to the second frame 102 directly but to the third frame 103. As shown in FIG. 4(b), a slot 1025 extending in a lateral direction (i.e., a direction vertical to the length direction of the mobile terminal 100) is formed in the second frame 102, i.e., the third rear part 1022, and the third frame 103 may move along the slot 1025. Although FIG. 4(b) shows that the slot 1025 is formed on the backside of the second frame 102, the slot 1025 may be formed on a lateral surface of the second frame 102. The second region 1512 may move in the first or second direction D1 or D2 against the second frame 102 together with the third frame 103, but the movement of the second region 1512 may be restricted within the backside of the mobile terminal 100 by the slot 1025. Namely, the second region 1512 does not move out of the second frame 102 despite that the second frame 102 is extended or contracted but may move within the second frame 102 along the slot 1025 by the extended or contracted distance. Therefore, the second region 1512 may be always exposed on the backside of the mobile terminal 100.

Eventually, as the first region 1511 may be disposed on the front side of the mobile terminal 100 so as to be always exposed on the front side irrespective of the movement of the second frame 102, and the second region 1512 may be disposed on the backside of the mobile terminal 100 so as to be always exposed on the backside irrespective of the movement of the second frame 102. The third region 1513 is disposed between the first and second regions 1511 and 1512, thereby being selectively disposed on the front side or backside of the mobile terminal 100 according to the moving direction D1/D2 of the second frame 102. According to the selective disposition of the third region 1513, as shown in FIG. 4(b), the second rear part 1013 of the first frame 101 is covered by the second and third regions 1512 and 1513 of the display unit 151 and the third rear part 1022 in the first state. Yet, in the second state, as the third region 1513 is moved to the front side of the mobile terminal 100, the third rear part 1022 is moved in the first direction D1 as well, thereby being possibly exposed out of the mobile terminal 100. Moreover, the second front part 1021 of the second frame 102 is disposed below the first front part 1011 of the first frame 101 in the first state but may be moved out of the first frame 101 in the second state so as to support the third region 1513 of the display unit 151 disposed on the front side of the mobile terminal 100.

As the first region 1511 and the second region 1512 are always disposed on the front side and the backside of the mobile terminal 100, respectively, the curvatures of the first and second regions 1511 and 1512 may maintain the flat basic state without variation. Yet, the third region 1513 may be bent or folder by being rolled around the roller 1028 within the second frame 102. When the first state is switched to the second state, the third region 1513 may be enlarged to the front side of the mobile terminal 100 from the second frame 102 by being rolled around the roller 1028 in a prescribed direction. On the contrary, when the second state is switched to the first state, the third region 1513 may be contracted into the second frame 102 from the front side of the mobile terminal 100 by being rolled around the roller 1028 in a reverse direction and return to the backside of the mobile terminal 100 from the second frame 102 simultaneously. Since only a specific portion of a foldable mobile terminal unfolded like a book is folded repeatedly, the specific portion is vulnerable to breakage. On the other hand, a deformed portion of the flexible display unit 151, i.e., the portion rolled around the roller 1028 is variable according to the first or second state of the mobile terminal 100, i.e., the movement of the second frame 102. Therefore, the mobile terminal 100 of the present disclosure may considerably reduce the deformation and fatigue applied repeatedly to the specific portion of the display unit 151, thereby preventing the breakage or damage of the display unit 151.

Based on the aforementioned configuration, the overall operation of the mobile terminal 100 is described as follows. For example, a state switching may be performed manually by a user, and an operation of the mobile terminal 100 during the manual state switching is described. Yet, operations of the first to third frames 101 to 103 and the display unit 151 may be identically performed in case of using a power source other than a user's force, i.e., in case of applying the drive unit 200 described later.

As shown in FIG. 3(a), FIG. 4(a) and FIG. 5(a), in the first state, the second frame 102 is fully contracted or retracted into the first frame 101. Therefore, only the first region 1511 of the display unit 151 fixed to the front side of the first frame 101 may be exposed on the front side of the mobile terminal 100. The first region 1511 may be fixed to and supported by the first frame 101, i.e., the first front part 1011 thereof. The third region 1513 may be disposed on the backside of the mobile terminal 100 together with the second region 1512 mostly and disposed within the second frame 102 in a state of being rolled around the roller 1028 in part. The third region 1513 of the backside of the mobile terminal 100 may be supported by the second frame, i.e., the third rear part 1022 1022 thereof. The second region 1512 may be fixed by the third frame 103 disposed on the second frame 1022 (i.e., the third rear part 1022) and movably coupled to the second frame 102.

In such a first state, if the second frame 102 is moved in the first direction D1, the mobile terminal 100 may switch to the second state. As shown in FIG. 3(b), FIG. 4(b) and FIG. 5(b), the second frame 102 is extended from the first frame 101 by the movement in the first direction D1 and may increase an overall size of the mobile terminal 100, and more particularly, the front side thereof. During the movement in the first direction D1, the second frame 102 may apply a force, i.e., tension to the display unit 151 in the first direction D1. As the display unit 151 is fixed to the first frame 101 but movably coupled to the second frame 102 using the third frame 103, the third region 1513 may be rolled out of the roller 1028 of the second frame 102 to the front side of the mobile terminal 100 by the force applied by the second fame 102. Namely, the third region 1513 may be withdrawn (or pulled out), extend or move out from the second frame 102. Simultaneously, a portion disposed on the third region 1513, and more particularly, on the backside of the mobile terminal 100 may be rolled into the roller 1028 of the second frame 102 or inserted (or pushed), retracted or moved in the second frame 102. The third region 1513 is not fully withdrawn from the second frame 102 to the front side of the mobile terminal 100, and a portion of the third region 1513 may be disposed in the second frame 102 in a state of being still rolled around the roller 1028. Moreover, for such a smooth movement of the third region 1513, the second region 1512 may move in the first direction D1 against the second frame 102 together with the third frame 103. Moreover, as described above, the second region 1512 and the third frame 103 may relatively move in the first direction D1 against the first frame 101 together with the second frame 102 by being restrained by the second frame 102. Therefore, the second region 1512 and the third frame 103 may move relatively in the first direction D1 not only for the second frame 102 but also for the first frame 101, thereby being capable of moving a distance longer than a moving distance of the second frame 102. Therefore, for the long movement of the second region 1512 in the first direction D1, the third region 1513 may be smoothly extended to the front side of the mobile terminal 100. For the movement of the third region 1513 in proportion to the extension of the second frame 102, the movement of the second region 1512 and the third frame 103 in the first direction D1 may be performed simultaneously with the movement of the third region 1513 and the second frame 102 in the first direction D1 so as to be proportional to the movement of the third region 1513 and the second frame 102.

Once the second frame 102 is fully extended in the first direction D1, the first and third regions 1511 and 1513 are disposed on the front side of the mobile terminal 100 and only the second region 1512 may be disposed on the backside of the mobile terminal 100. The first and third regions 1511 and 1513 may be supported by the first frame (i.e., the first front part 1011 thereof) and the second frame (i.e., the second front part 1021 thereof). As the second frame 102, i.e., the third rear part 1033 thereof is extended in the first direction D1, they may expose the second rear part 1013 of the first frame 101 support the moving third region 1513. Therefore, in the second state, the mobile terminal 100 may have the enlarged front display unit 151.

On the other hand, if the second frame 102 is moved in the second direction D2 in the second state, the mobile terminal 100 may return to the first state as shown in FIG. 3(a), FIG. 4(a) and FIG. 5(a). The second frame 102 is retracted into the first frame 101 by the movement in the second direction D2, thereby reducing the overall size of the mobile terminal 100, and particularly, the front side thereof. The movement of the display unit 151 during the movement of the second frame 102 may be performed in reverse order of the aforementioned movement in the first direction D1. Schematically, the third region 1513 may be rolled into the roller 1028 of the second frame 102 from the front side of the mobile terminal 100 or inserted/retracted/moved in the second frame 102. Simultaneously, the third region 1513 may be rolled out of the roller 1028 of the second frame 102 or withdrawn/extended/moved out of the roller 1028 of the second frame 102 to the backside of the mobile terminal 100. The third region 1513 is not fully withdrawn from the second frame 102 to the backside of the mobile terminal 100, and a portion of the third region 1513 may be disposed in the second frame 102 in a state of being still rolled around the roller 1028. Moreover, for such a smooth movement of the third region 1513, the second region 1512 may move in the second direction D2 against the second frame 102 together with the third frame 103, and the second region 1512 and the third frame 103 may relatively move in the second direction D2 against the first frame 101 together with the second frame 102 by being restrained by the second frame 102. Therefore, the second region 1512 and the third frame 103 may move relatively in the second direction D2 not only for the second frame 102 but also for the first frame 101, thereby being capable of moving a distance longer than a moving distance of the second frame 102. For the long movement of the second region 1512, the third region 1513 may smoothly return to the backside of the mobile terminal 100. Moreover, for the movement of the third region 1513 in proportion to the retraction of the second frame 102, the movement of the second region 1512 and the third frame 103 in the second direction D2 may be performed simultaneously with the movement of the third region 1513 and the second frame 102 in the second direction D2 so as to be proportional to the movement of the third region 1513 and the second frame 102. If the second frame 102 is fully retracted in the second direction D2, the mobile terminal 100 may switch to the first state mentioned in the foregoing description and have the front display unit 151, which is relatively reduced smaller than that the second state, in the first state.

Figure 6:
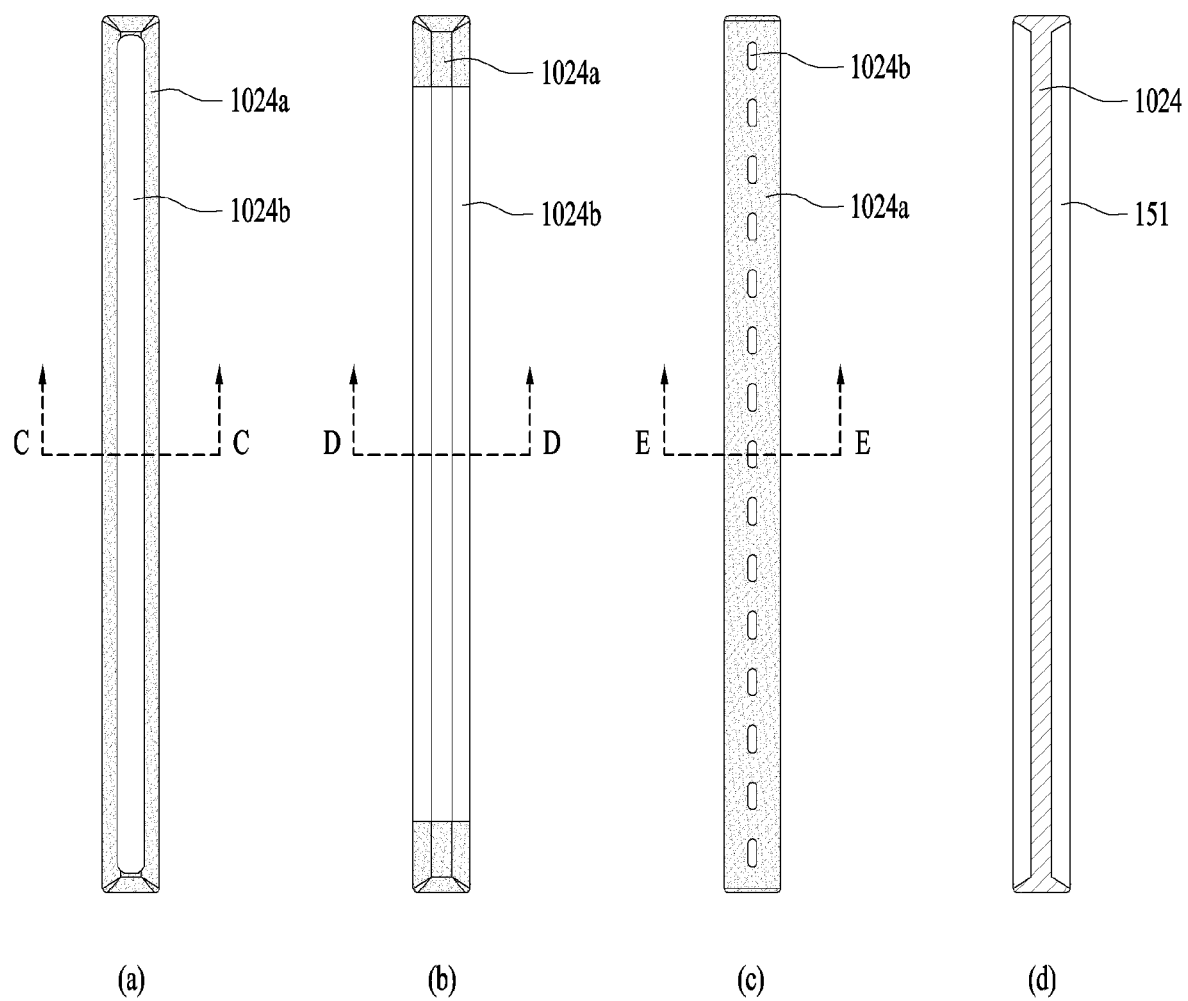
FIG. 6 is a view showing various embodiments of a side frame of a mobile terminal.

Meanwhile, in the mobile terminal 100 according to the preset disclosure, the side frame 1024 may have various configurations to perform various functions. FIG. 6 is a view showing various embodiments of a side frame of a mobile terminal, and FIG. 7 is a cross-sectional view showing side frames and adjacent components, obtained along the cutting lines C-C, D-D and E-E of FIG. 6, respectively. The side frame 1024 and the components adjacent thereto are described in detail with reference to the accompanying drawings as follows.

First of all, the side frame 1024 may include a non-transparent or transparent material or be configured in a manner of mixing a non-transparent and a transparent material together. As shown in FIG. 6(a), the side frame 1024 includes a transparent part 1024b in the middle of a non-transparent part 1024a, thereby forming a window through which the display unit 151 rolled around the roller 1038 1038 is exposed. As shown in FIG. 6(b), the side frame 1024 has a further enlarged region of a transparent part 1024b, thereby enlarging the exposed display unit 151. Through the transparent part 1024b, an image or text outputted from the flexible display unit 151 is viewable.

A user input may be performed on a lateral side using a touch sensor of the flexible display unit 151. For a touch input, the side frame 1024 may include a conductive material. By forming a protrusion at a conductive material contained portion, a user may touch the protrusion to input a user command.

An inner side of the side frame 1024 corresponding to a curvature of the flexible display unit 151 rolled around the roller 1028 is formed to have a thicker middle portion, thereby securing rigidity with a natural curved surface.

As shown in FIG. 6(c), a transparent part 1024b of a prescribed pattern is configured, thereby providing a user with notification by driving the flexible display unit 151. For example, if there is an incoming call, the flexible display unit 151 may be driven to emit light sequentially.

If there is a notification push of a message or application, notification may be provided in a manner of projecting a light in specific color from the flexible display unit 151 rolled around the roller 1028. Therefore, notification may be provided to a user using the flexible display unit 151 without the separate optical output unit 154. In this case, the transparent part 1024b may obtain an effect of spreading light delicately using a semi-transparent material instead of a fully-transparent material.

As shown in FIG. 6(d), a terminal may be implemented in a manner that a thickness-directional width of a region of a side frame 1024 is narrowed to provide an edge region extended to a prescribed region in a lateral direction to an end of the display unit 151.

The side frame 1024 prevents a breakage problem caused when a face of the flexible display unit 151 folded by an out-folding scheme is exposed externally, whereby durability of the mobile terminal 100 may be enhanced.

FIG. 7 shows configurations of the roller 1028 and the flexible display unit 151 as well as the side frame 1024. The flexible display unit 151 of the preset disclosure may include a display panel 151b outputting a video and a back plate 151c supporting a backside of the display panel 151b.

The display panel 151b is a flexible video display device and may include an Organic Light Emitting Diode (OLED). The back plate 151c may use a metal plate provided to the backside of the display panel 151 with rigidity to support the display panel 151b. If the display panel 151b is bent, the metal plate may be bent together with the display panel 151b.

The back plate 151c and the display panel 151b may be attached to each other using an adhesive member. And, the adhesive member may use a double-sided tape such as OCA flexible within a prescribed range like a foam material. Hence, the adhesive member can offset the slip effect due to a curvature radius difference between the back plate 151c and the display panel 151b.

In order to achieve the natural folding when the third region 1513 is deformed, a groove elongated in the third direction, i.e., the length direction of the mobile terminal 100 may be formed on a surface of a region of the back plate 151c corresponding to the third region 1513. Namely, such a groove may be elongated in a straight line between top and bottom ends of the back plate 151c.

Although the back plate 151c has the rigidity, it is unable to completely prevent the droop of the display unit 151. Hence, the display unit 151 may further include a support frame 300 located on a region corresponding to the third region 1513 thereof.

The support frame 300 may include a plurality of support bars 310 elongated in the third direction, i.e., the length direction of the mobile terminal 100. The support bar 310 may be continuously elongated between the top and bottom ends of the display unit 151. The support bars 310 may be spaced apart from each other in a prescribed distance along the length direction of the display unit 151. As the support bars 310 are not formed wide, they may support the backside of the flexible display unit 151 without interrupting the bending deformation of the flexible display unit 151. Particularly, in order to avoid the interference between the support bars 310 in case of folding the display unit 151, each of the support bars 310 may have a trapezoidal or trigonal cross-section so that a size of a portion attached to the back plate 151c is smaller than that of an opposite side.

The support bar 310 may be formed by plastic injection molding. If necessary, as shown in FIG. 7(b), the rigidity of the support frame 300 may be reinforced by embedding a rigid bar 320 of a metal material in the support bar 310.

The thickness of the support frame 300 may be formed to correspond to that of the first front part 1011 of the first frame 101. As shown in FIG. 5(b), the second front part 1021 used to be located inside the first front part 1011 in the first state is located on the backside of the third region 1513 of the flexible display unit 151 in the second state. Since a separation space amounting to the thickness of the first front part 1011 is formed between the second front part 1021 and the display unit 151, i.e., the back plate 151c, it causes a problem that the third region 1513 of the flexible display unit 151 droops.

The support frame 300 fills the separation space between the second front part 1021 and the display unit 151, i.e., the back plate 151c and supports the third region 1513 of the flexible display unit 151. Preferably, the thickness of the support frame 230 may have the thickness corresponding to the separation space between the second front part 1021 and the back plate 151c, i.e., the thickness of the first front part 1011. Moreover, as shown in FIG. 5(a), a separation due to the thickness of the third frame 103 may be generated between the second frame, i.e., the third rear part 1022 thereof and the display unit 151. The support frame 300 may fill such separation as well, thereby supporting the third region 1513 more stably. To perform such a function, as described above, the support frame may be provided to the third region 1513, and more particularly, to the backside of the third region 1513 only.

In case that the support frame 300 has sufficient rigidity, the second front part 1021 of the second frame 102 may be skipped. In this case, the corresponding thickness may be set irrespective of the first front part 1011 of the first frame 101.

The roller 1028 may have various structures to enable the flexible display unit 151 to be rolled around the roller 1028 by contacting with a surface of the support frame 200 without being moved back. For example, as shown in FIG. 7(b), the roller 1028 may include a gear disposed on a circumferential surface thereof and engaged between the support bars 310. On the other hand, as shown in FIG. 7(c), a first sawtooth may be formed on a surface of the roller 1028 and a second sawtooth 310a engaging with the first sawtooth 1028a may be formed on a surface of the support frame 300 as well.

As shown in FIGS. 7(a) to 7(c), a rear cover 104 covering the backside of the mobile terminal 100 may be further included. As at least one portion of the rear cover 104 is transparent, a video outputted from the flexible display unit 151 located on the rear side can be checked. A portion of the rear cover 104 covering the first rear part 1012 may be formed transparent to correspond to the camera 121, the flash and the like at least.

The rear cover 104 may be coupled to the first frame 101 and cover it substantially by being directly coupled on the first rear part 1012. The rear cover 104 may not be coupled to the third rear part 1022 of the second frame 102, the third frame 103 and the flexible display unit 151 but may simply cover them. To this end, the rear cover 104 may be spaced apart from the second rear part 1013 by the total thickness of the third rear part 1022 of the second frame 102, the third frame 103 and the flexible display unit 151. In order not to interrupt the movement of the flexible display unit 151 and to prevent the breakage of the display unit 151, the rear cover 104 may be configured not to contact with the display unit 151. If the mobile terminal 100 is in the first state, the rear cover 104 may cover the flexible display unit 151. If the mobile terminal 100 is in the second state, the rear cover 104 may cover and protect the second rear part 1013 exposed by the movement of the flexible display unit 151 and the third rear part 1022.

The rear cover 104 may be coupled to the second frame 102. In this case, in the first state, the rear cover 104 may cover the entire backside of the mobile terminal 100, i.e., the first rear part 1012 and the display unit 151. In the second state, the rear cover 104 moves together with the second frame 102 and may cover the third rear part 1022 of the second frame 102 exposed by the movement of the display unit 151 and the second region 1512 of the flexible display unit 151 coupled to the third frame 103.

Meanwhile, when the flexible display unit 151 is enlarged in a manner that a user manually moves the second frame 102, the flexible display unit 151 may be twisted or the first or second frame 101 or 102 may be broken or damaged due to a force applied non-uniformly. Therefore, the mobile terminal 100 of the present disclosure may include a drive unit 200 configured to uniformly apply a force to the second frame 102 for movement. The drive unit 200 may move the second frame 102 in a manner of applying a force to the second frame 102 automatically according to a user's instruction or a prescribed condition.

Figure 8:
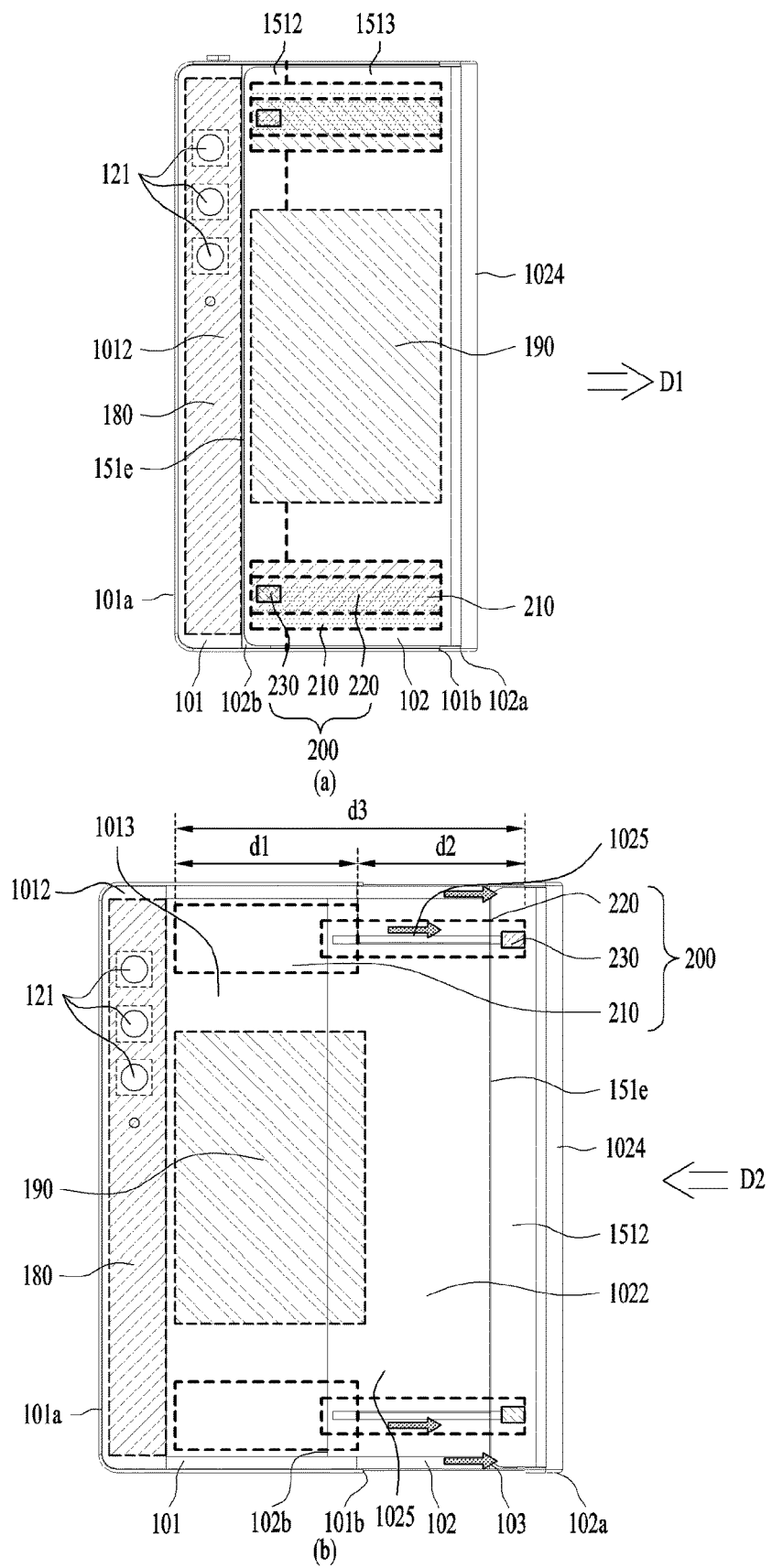
FIG. 8 is a backside view showing an operation of a drive unit and first and second states of a mobile terminal implemented by the operation.

The drive unit 200 is described in detail with reference to the relevant drawing as follows. FIG. 8 is a backside view showing an operation of a drive unit and first and second states of a mobile terminal implemented by the operation. An operation principle of the drive unit 200 is described first with reference to FIG. 8.

The drive unit 200 may be configured to move the second frame 102 relatively to the first frame 101 or move the third frame 103 relatively to the second frame 102. In particular, the drive unit 200 may move the second frame 102 in the first direction D1 against the first frame 101 and move the third frame 103 in the first direction D1 against the second frame 102. By the movement in the first direction D1, as described above, the mobile terminal 100 is switched to the second state from the first state. And, by the movement of the display unit 151 to the front side of the mobile terminal 100, the mobile terminal 100 may secure an enlarged front display region. Alternatively, the drive unit 200 may move the second frame 102 in the second direction D2 opposite to the first direction D1 against the first frame and move the third frame 103 in the same second direction D2. By the movement in the second direction D2, as described above, the mobile terminal 100 is switched to the first state from the second state. And, by the movement of the display unit 151 to the backside of the mobile terminal 100, the mobile terminal 100 may return to have a reduced front display region. Besides such basic movements, the drive unit 200 may be configured to perform all movements of the second and third frames 102 and 103 and the display unit 151 linked to them, which are required for the aforementioned state switching of the mobile terminal 100.

As schematically shown in FIG. 8, in order for the mobile terminal 100 to enter the second state, the second frame 102 may be moved in the first direction D1 by a first distance d1 preset for the first frame 101. Since the third frame 103, i.e., the second region 1512 is coupled to the second frame 102, it may basically move in the first direction D1 by the first distance d1 against the first frame 101 together with the second frame 102. By such a movement of the second frame 102, the front side of the mobile terminal 100 may be extended in the first direction D1 by a second distance d2 equal to the first distance d1. Hence, in order to move the display unit 151, and particularly, the third region 1513 to the front side of the mobile terminal 100 by the extended second distance d2, as shown in the drawing, the third frame 103 should further move in the first direction D1 against the second frame by the second distance d2 equal to the first distance d1 additionally. Hence, the display unit 151, i.e., the third frame 103 may move in the first direction D1 by a third distance d3 amounting to a double of the first distance d1 that is the moving distance of the second frame 102. On the other hand, in order to make the mobile terminal 100 to return to the first state, the second and third frames 102 and 103 may move in a manner opposite to the former description. Schematically, the second frame 102 moves in the second direction D2 against the first frame 101 by the first distance d1, and the third frame 103 may move in the second direction D2 against the second frame 102 by the second distance d2 in addition to the movement by the first distance d1 against the first frame 101. Hence, for the switching to the first state, the display unit 151, i.e., the third frame 103 may move in the second direction D1 by the third distance d3 amounting to the double of the first distance d1 that is the moving distance of the second frame 102. For that reason, the drive unit 200 may be configured to move the third frame 103 against the first frame 101 as well as the second frame 102, thereby moving the third frame 103 by the aforementioned long distance, i.e., the third distance d3.

While the front side of the mobile terminal 100 is increased or decreased by the movement of the second frame 102, if the display unit 151 fails to move in proportion to such increase or decrease of the front side, the enlargement or reduction of the display unit 151 on the front side of the mobile terminal 100 may not be smoothly performed. For that reason, the drive unit 200 may be configured to synchronize the movement, i.e., slide of the third frame 103 with the movement, i.e., slide of the second frame 102. Particularly, the drive unit 200 may be configured to synchronize a timing of starting the movement of the third frame 103 with a timing of starting the movement of the second frame 102. Namely, the drive unit 200 may be configured to make the third and second frames 103 and 102 start to move simultaneously. The simultaneous movements of the second and third frames 102 and 103 may start at the same location on the mobile terminal 100. Namely, the drive unit 200 may synchronize a location of starting the movement of the third frame 103 with a location of starting the movement of the second frame 102. Together with the synchronizations of the movement start timing and the movement start locations, the drive unit 200 may be configured to synchronize a moving speed of the third frame 103 with a moving speed of the second frame 102. Hence, the drive unit 200 may simultaneously move the second and third frames 102 and 103 from the same location within the same time by the same distance (i.e., the first distance d1 against the first frame 101 in case of the second frame 102, the second distance d2 against the first frame 102 in case of the third frame 103) against the first and second frames 101 and 102, respectively. Moreover, since the third frame 103 basically moves by the first distance d1 by being carried by the second frame 102, it may move long owing to the above-synchronized movement by the third distance d3 amounting to the sum of the first and second distances d1 and d2 overall by moving in proportion to the moving distance of the second frame 102. For that reason, by the drive unit 200, according to the increase/decrease of the front side of the mobile terminal 100, the display unit 151 may be smoothly enlarged/reduced on the front side.

The drive unit 200 is configured to satisfy such requirements. As schematically shown in FIG. 8. The drive unit 200 may include a supporter 210, a first actuator 220 movably coupled to the supporter 210, and a second actuator 230 movably coupled to the first actuator 220. The first actuator 220 reciprocates on a straight line in prescribed directions, i.e., the first and second directions D1 and D2 against the supporter 210 and may be configured to move the second frame 102. And, the second actuator 230 reciprocates on a straight line in the first and second directions Da and D2 against the first actuator 220 and may be configured to move the third frame 103. Namely, the drive unit 200 has the telescopic structure that includes the straight-lined reciprocating first and second actuators 220 and 230 as stages. Through the telescopic structure, the drive unit 200 may be configured to achieve the required moving distances of the second and third frames 102 and 103. Moreover, the drive unit 200 may be configured to synchronize the movement of the first actuator 220 and the movement of the second actuator 230 together for the synchronization of the movements of the second and third frames 102 and 103. The first and second actuators 220 and 230 of the drive unit 200 provide power to the frames 102 and 103 by linking to the second and third frames 102 and 103 and may perform the movements required for the frames 102 and 103 identically for the aforementioned state switching of the mobile terminal 100. Configurations and operations of the parts of the drive unit 200 are described in detail.

As shown in FIG. 2 and FIG. 8, the drive unit is configured as a compact module and may be appropriately installed in a limited inner space within the mobile terminal 100. Since the drive unit 200 is configured to move the second and third frames 102 and 103, it may be installed at the first frame 101 that is relatively stationary against the frames 102 and 103. Particularly, a prescribed seat 1013a is formed in the second rear part 1013 of the first frame 101 adjacent to the second and third frames 102 and 103. The seat 1013a may be configured to be open to or communicate with the second and third frames 102 and 103. The drive unit 200 is installed in the seat 1013a, and the first and second actuators 220 and 230 thereof may be coupled to the second and third frames 102 and 103 to move, respectively.

Moreover, the mobile terminal 100 may include a single drive unit 200, by which the movements of the second and third frames 102 and 103 may be performed. Meanwhile, for further stable movements of the second and third frames 102 and 103, a pair of the drive units 200 may be provided to the mobile terminal 100. In this case, as shown in FIG. 2 and FIG. 8, a pair of the drive units 200 may be disposed on top and bottom in a manner of being spaced apart from each other in a prescribed distance, respectively and oriented in a direction vertical to the lateral direction, i.e., the length direction of the mobile terminal 100 so as to move the first and second actuators 220 and 230 in the first and second directions D1 and D2. As a pair of the drive units 200 may apply the uniform force to the second and third frames 102 and 103 from the spaced two points, the second and third frames 102 and 103 may be moved more stably.

Figure 10:
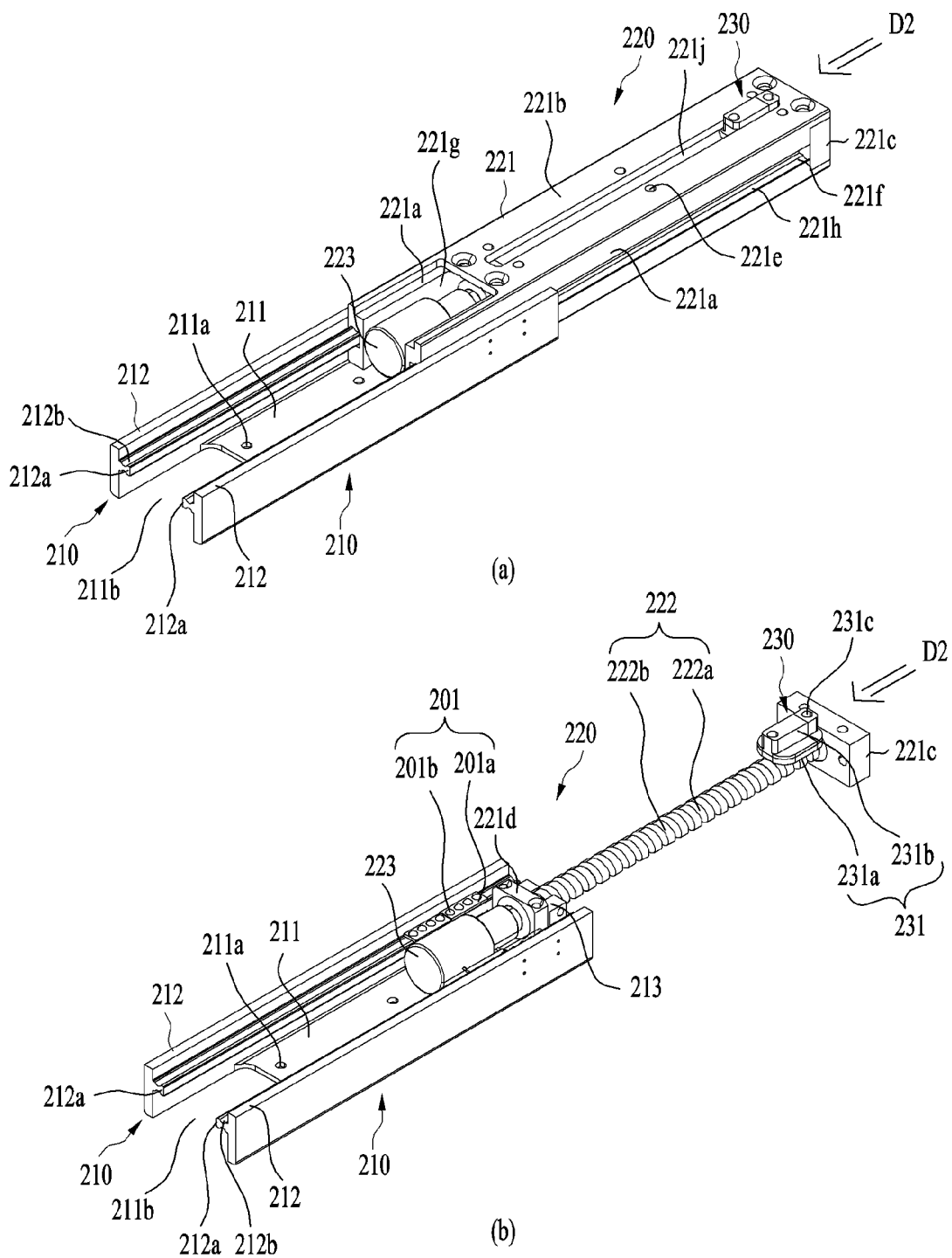
FIG. 10 is a perspective view showing a drive unit in a second state.
Figure 11:
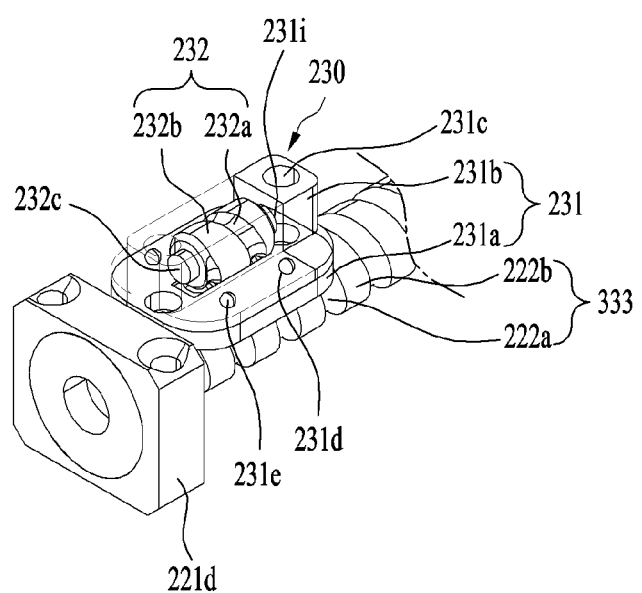
FIG. 11 is a perspective view showing a third actuator of a drive unit in detail.
Figure 12:
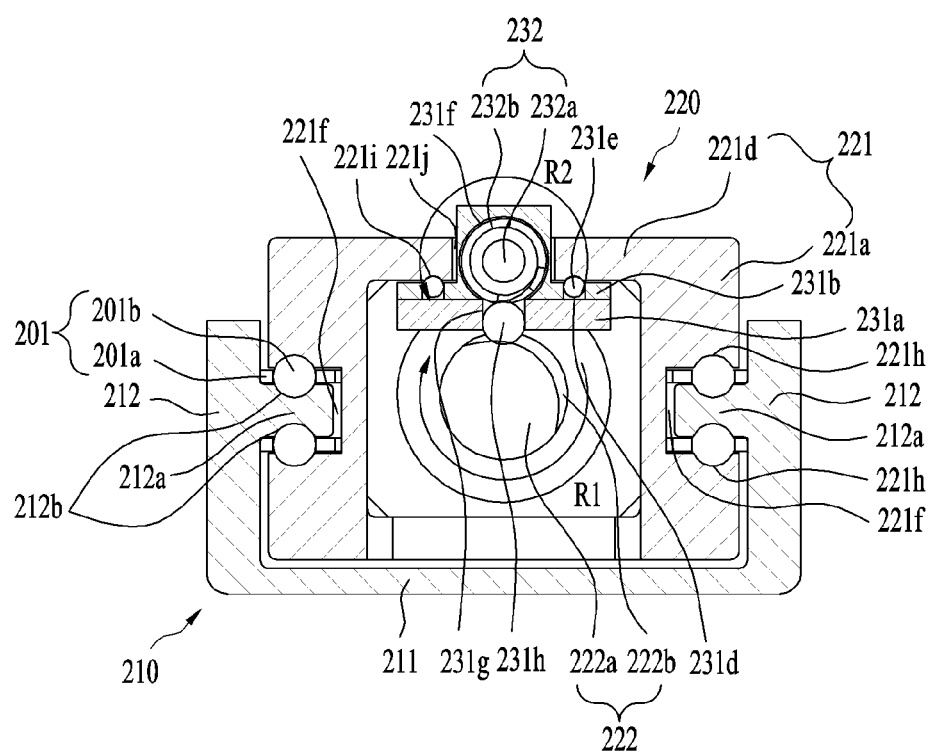
FIG. 12 is a cross-sectional view of a drive unit obtained along the cutting line F-F of FIG. 9.
Figure 13:
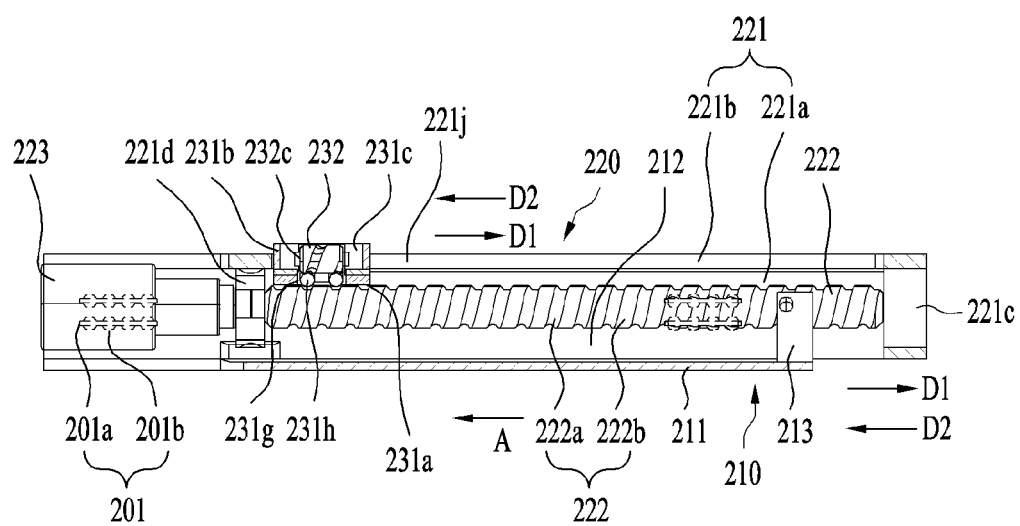
FIG. 13 is a lateral view showing drive mechanisms of first and second actuators of a drive unit in detail.

As continuation of the aforementioned schematic description, the drive unit 200 is described in detail with reference to the relevant drawings as follows. FIG. 9 is a perspective view showing a drive unit in a first state and FIG. 10 is a perspective view showing a drive unit in a second state. FIG. 11 is a perspective view showing a third actuator of a drive unit in detail. FIG. 12 is a cross-sectional view of a drive unit obtained along the cutting line F-F of FIG. 9. And, FIG. 13 is a lateral view showing drive mechanisms of first and second actuators of a drive unit in detail.

Figure 14:
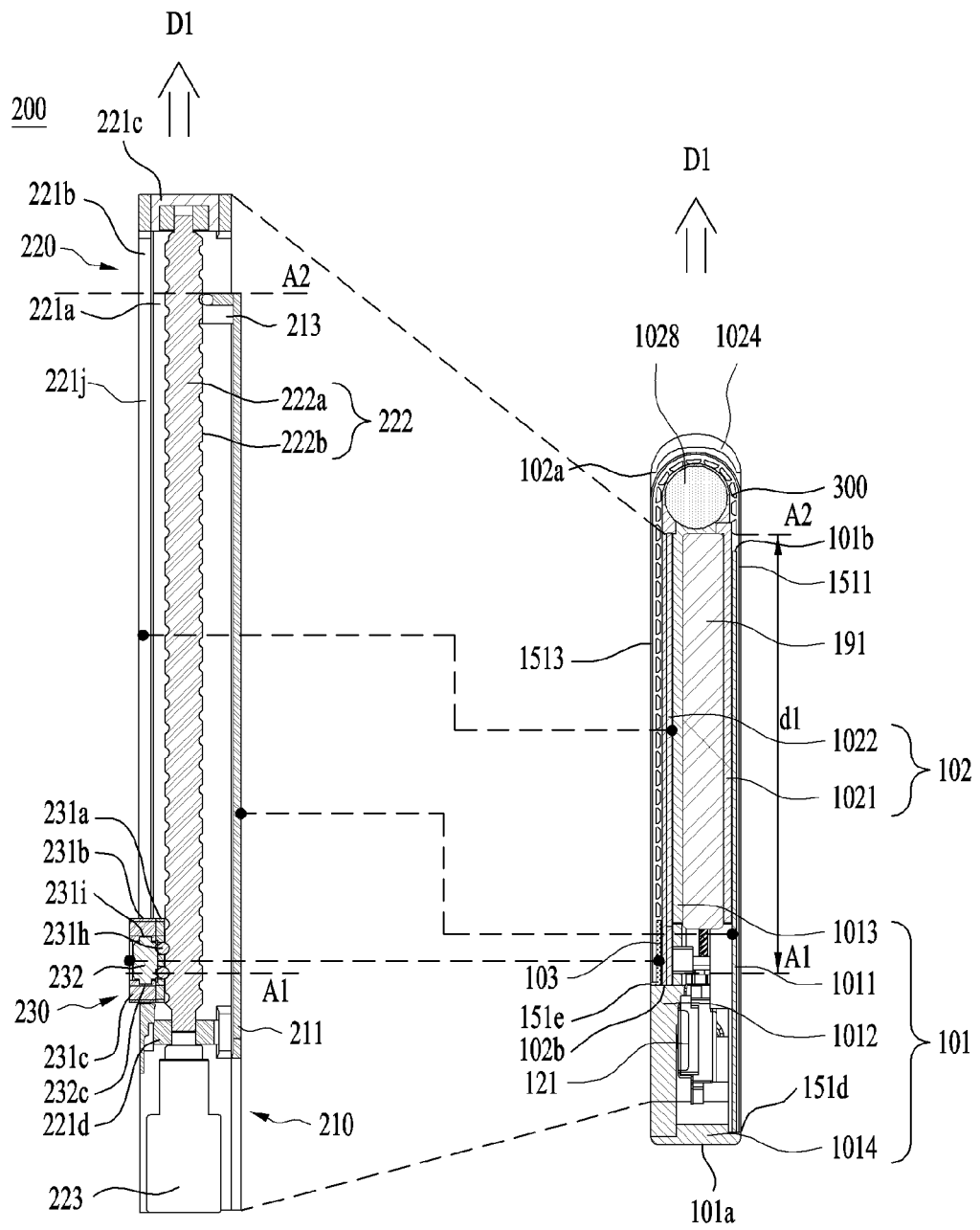
FIG. 14 is a lateral cross-sectional view showing states of first to third frames by an operation of a drive unit in a first state.
Figure 15:
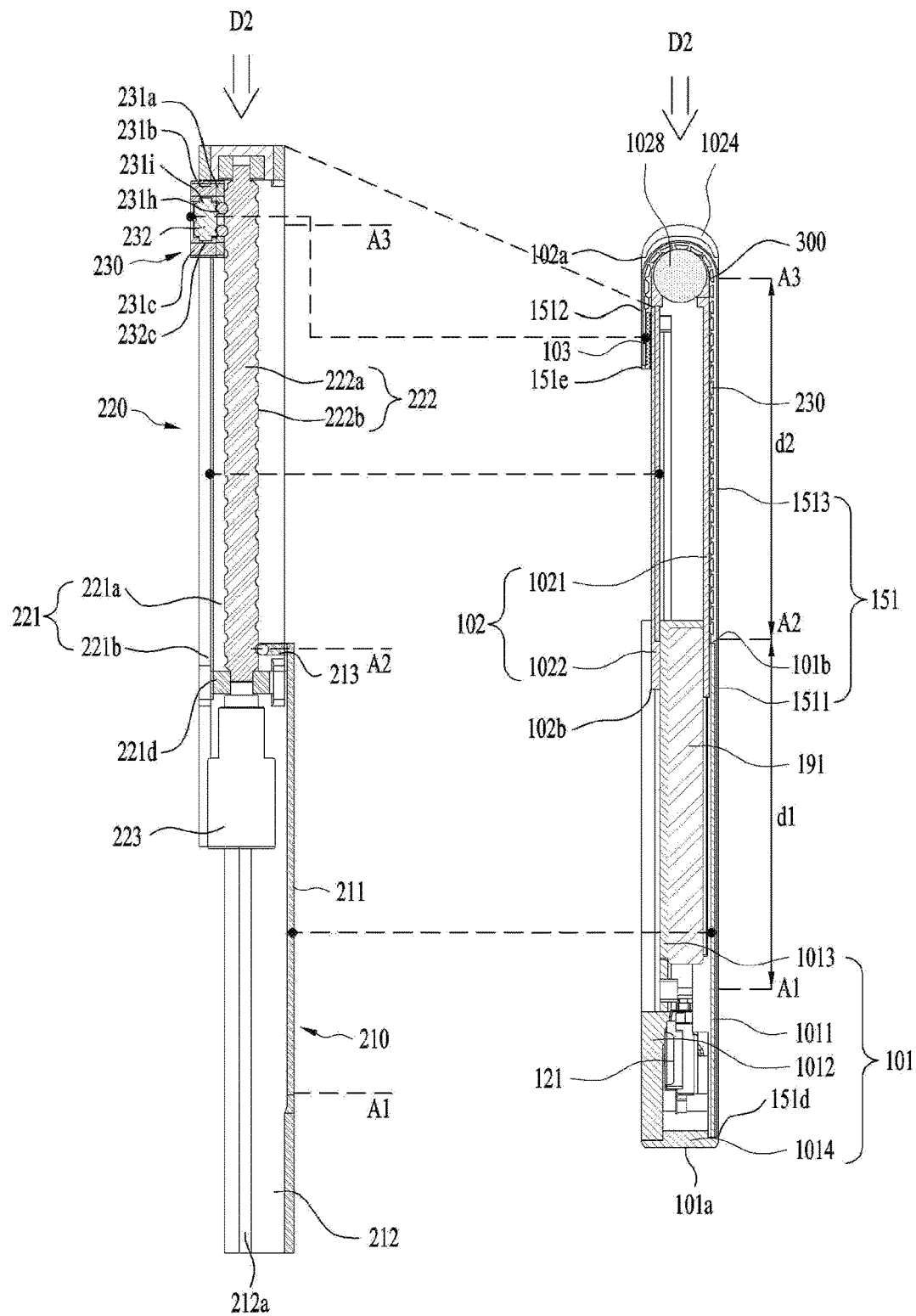
FIG. 15 is a lateral cross-sectional view showing states of first to third frames by an operation of a drive unit in a second state.

For the accurate understanding of the structure of the drive unit 200, FIGS. 9 to 13 show a coupling part with a backside of the drive unit 200, i.e., the second and third frames 102 and 103. Yet, when the mobile terminal 100 is viewed in front, as shown in FIG. 14 and FIG. 15, the drive unit 200 is substantially disposed in the mobile terminal 100 in a manner of being upside down. As shown in FIG. 9(b) and FIG. 10(b), a portion of the first actuator 220, i.e., a housing 221 is removed to provide a better view of the internal structure of the first actuator 220.

Referring to FIGS. 9 to 13, the drive unit 200 may include the supporter 210 configured to support movable components, i.e., the first and second actuators 220 and 230. The supporter 210 may include a base 211. As shown in the drawing, the base 211 may include a narrow and elongated plate-type member so as to be installed in the limited internal space of the mobile terminal 100. Although the base 211 may be configured to support the movable components, and more particularly, the first actuator 220 directly, the supporter 210 may include a sidewall 212 for the stable support. The sidewall 212 may be elongated vertical to the base 211 and may also be elongated long along a length direction of the base 211. The sidewall 212 may be connected to a side part of the base 211. The sidewall 212 confronts a side part of the first actuator 220 and may be configured to support the movement of the first actuator 220 in the length direction of the supporter 210, i.e., a straight-lined reciprocating motion of the first actuator 220 in the first and second directions D1 and D2. The sidewall 212 may contact with the side part of the first actuator 220 to support stably. For more stable support, the supporter 210 may include an additional sidewall 212. Namely, the supporter 210 may include a pair of the sidewalls 212 elongated vertically from the side parts of the base 211 and spaced apart from each other in a prescribed distance. Therefore, the supporter 210 may have a structurally stable channel structure. A pair of the sidewalls 212 confront both side parts of the first actuator 220 and may support the motion of the first actuator 220 stably.

The supporter 210 is configured to maintain a stationary state for the relative motions of the first and second actuators 220 and 230, thereby being fixed to the first frame 101 relatively stationary against the second and third frames 102 and 103 in the mobile terminal 100. Particularly, as shown in FIG. 2, the supporter 210 may be inserted in the seat 1013a of the second rear part 1013 together with the first and second actuators 220 and 230, whereby the base 211 may be coupled to an adjacent backside of the first front part 1011. The base 211 includes a fastening hole 211a and may be fixed to the first frame 101, and more particularly, to the first front part 1011 using a fastening member and the fastening hole 211a.

The drive unit 200 may include the first actuator 220 movably coupled to the supporter 210. The first actuator 220 is configured to move in the first or second direction D1 or D2 against the supporter 210. By such movement, the first actuator 220 may be extended from or retracted into the supporter 210 in a prescribed length. The first actuator 220 is coupled to the second frame 102, thereby moving the second frame 102 in the first or second direction D1 or D2. Like the slide motion performed by the second frame 102, the motion of the first actuator 220 may correspond to the slide motion against the supporter 210.

First of all, the first actuator 220 may include a first housing 221. The first housing 221 is movably coupled to the supporter 210, and more particularly, to the sidewall 212 thereof, thereby enabling the first actuator 220 to be movable against the supporter overall. Particularly, the first housing 221 may include a sidewall 221a. The sidewall 221a may be oriented vertical to the base 211 of the supporter 210 and also oriented side by side with the sidewall of the supporter 210. And, the sidewall 221a may be elongated long along the sidewall 212 of the supporter 210. Hence, the sidewall 221a may be supported by the sidewall 212 of the supporter 210 and move along the sidewall 212. For stably support, the sidewall 221a may contact with the sidewall 212 of the supporter 210. The first housing 211 may include a pair of the sidewalls 211a spaced apart from each other, and may be supported by the sidewalls 212 of the supporter 210 for the stable movement of the first actuator 220, respectively. The first housing 221 is configured to be coupled to the second frame 102, whereby the first actuator 220 may move the second frame 102. Particularly, the first housing 221 may include cover 221b connected to the sidewall 221a and elongated long along the sidewall 221a. The cover 221b includes a fastening hole 221e and, as well shown in FIG. 2, FIG. 14 and FIG. 15, may be coupled to the second frame 102, and particularly, to the third rear part 1022 thereof using a fastening member and the fastening hole 221e. in case that the first housing 221 includes a pair of the sidewalls 221a, the cover 221b may connect a pair of the sidewalls 221a and enclose components of the first actuator 220. Furthermore, the first housing 221 may be coupled to the supporter 210, thereby forming a single container having a prescribed internal space together with the supporter 210. And, the components of the first and second actuators 220 and 230 may be received and protected in the container.

The first actuator 220 may include a thruster 222 received in the first housing 221. The thruster 222 may have a body 222a elongated long. The body 22a may include a rod having a circular cross-section, as shown in the drawing, or a cross-section in a different shape. The thruster 222 may include a thread 222b formed on a surface of the body 222a. Hence, the thruster 222 may include a screw gear overall. Such a thruster 222 may be moved by rotation in a state of being thread-coupled to another structure and may substantially move the first actuator 220 and the second frame 201 connected thereto. Hence, the thruster 222, and the thread 222b thereof may have a length amounting to a moving distance required for the second frame 201. Here, the thread coupling may mean to couple two members together to perform relative motions to each other using the thread. Namely, in the thread-coupling, a thread formed on one member may engage with a thread formed on the other. One of the two thread-coupled members may perform a straight-lined motion by rotating relatively to the other. The definition of the thread coupling is exactly applied to the following description and additional description shall be omitted.

The thruster 222 is oriented in the first housing 221 along the length direction of the first housing 221, and may be rotatably installed in the first housing 221. Particularly, the first housing 221 may include a pair of bearings 221c and 221d spaced apart from each other in a prescribed distance, i.e., a length of the thruster 222. By the bearings 221c and 221d, both ends of the thruster 222 may be rotatably supported. If the first housing 221 has a pair of the sidewalls 221a, the thruster 222 is disposed between the sidewalls 221a along the length direction thereof, the bearings 221c and 221d are coupled to the sidewalls 221a, and the bearings 221c and 221d may be oriented to traverse the sidewalls 221a.

The thruster 222 may be thread-coupled to the supporter 221 as well. Particularly, as shown in the drawing, the supporter 210 may include a sleeve 213 provided by a portion of the supporter 210, i.e., the base 211 for example. The sleeve 213 may include a thread engaging with the thruster 222. For example, such a thread may be formed on an inner circumference of the sleeve 213. If necessary, the sleeve 213 may be disposed on the sidewall 212 of the supporter 210. Meanwhile, the first housing 221 may include an opened portion (a bottom part of the first housing 221 in the drawing, a top part of the first housing 221 in the actual orientation of the mobile terminal 100), as shown in the drawing. The thruster 222 is exposed to the supporter 210 through the opened portion of the first housing 221, thereby being thread-coupled to the sleeve 213. Moreover, a ball bearing may be inserted between the thruster 222 and the sleeve 213 for the smooth relative motion.

As well shown in FIG. 12 and FIG. 13, the thruster 222 may rotate in a first rotation direction R1 or a second rotation direction R2 counter to the first rotation direction R1. For example, the first rotation direction R1 may be a clockwise direction and the second rotation direction R2 may be a counterclockwise direction. For example, if the thruster 222 rotates in the first rotation direction R1, as shown in FIG. 13, the supporter 210 coupled to the thruster 222 may move in a direction A along the thread of the thruster 222 by the thread coupling, i.e., the supporter 210 may go backward. Yet, as the supporter 210 is fixed to the first frame 101, the thruster 222 coupled to the sleeve 231 may move and go forward in a direction (i.e., the first direction D1) opposite to the direction A relatively to the supporter 210. Moreover, if the thruster 222 rotates in the second rotation direction R2, the thruster 222 may move and go backward in the direction A, i.e., the second direction D2 relatively to the supporter 210. As described above, since the thruster 222 is linked to other components of the first actuator 220 as well as the first housing 221, the thruster 222 may move the components of the first actuator 220 together in the first or second direction D1 or D2 while moving in the first or second direction D1 or D2 by the thread coupling to the supporter 210. By such movements, the drive unit 200, i.e., the first actuator 220 thereof may be extended in a prescribed length from the supporter 220 (i.e., the movement in the first direction D1) or retracted into the original position (i.e., the movement in the second direction D2). As the second actuator 230 is coupled to the first actuator 220, the thruster 222 may move the second actuator 230 in the first or second direction D1 or D2. Hence, the thruster 222 may be configured to thrust the first actuator 210 in the first or second direction D1 or D2 relatively to the supporter 210 by the rotation of the first or second rotation direction R1 or R2 of the thruster 222. Moreover, as the first actuator 220 may be substantially regarded as the thruster 222 itself, it may be described that the first actuator 220 is configured to move the first or second direction D1 or D2 according to the rotation direction R1 or R2 of the first actuator 220 by being thread-coupled to the supporter 210.

Meanwhile, the first actuator 220 may further include a motor 223 configured to rotate the thruster 222. The thruster 222 may be rotated by being mechanically connected to a power source outside the drive unit 200. Yet, by including the motor 223, the first actuator 220 may become a self-propelled mechanism. As shown in the drawing, the motor 223 is received in the first housing 221 and may be supported by the first housing 221. For example, the motor 223 may be supported by the sidewall 221a or the cover 221b. The motor 223 may be connected to the thruster 222 via a transmission device. Alternatively, as shown in the drawing, the motor 223 may be directly connected to the thruster 222 for the compact size of the drive unit 200. In case of being directly connected to the thruster 222, as shown in FIG. 14 and FIG. 15, the motor 223 may be supported by the bearing 221d supporting the thruster 222 without being supported by other parts of the first housing 221. For the smooth power transmission, the motor 223, and particularly, a drive shaft thereof is preferably disposed on the co-axis of the thruster 222. The cover 221b may include a cut-off 221g formed adjacent to the motor 223. The motor 223 is exposed from the first actuator 220 through the cut-off 221g, thereby facilitating its replacement and repair. The supporter 210 may include a cut-off 211b formed in the base 211 and aligned with the cut-off 221g of the first actuator 220. The cut-off 211b may be substantially aligned with and communicate with the cut-off 221g in the first state of the mobile terminal 100, i.e., a state that the first actuator 220 is fully retracted. Owing to the aligned cut-offs 211b and 221g, the motor 223 becomes more easily accessible and more conveniently repairable.

On the other hand, the drive unit 200 may additionally include a guide for the more smooth movement of the first actuator 220. As well shown in FIG. 9, FIG. 10 and FIG. 12, as such a guide, a rail 212a may be provided to the supporter 210. The rail 212a may protrude from the supporter 210, and particularly, from the sidewall 212 thereof toward the first actuator 220, and particularly, toward the sidewall 221a thereof. The rail 212a may be elongated long in the length direction of the supporter 210. As the guide, a recess 221f may be provided to the first actuator 220. The recess 221f is formed on the first actuator 220, and particularly, the sidewall 221a thereof and may be elongated in the length direction of the first actuator 220. The recess 221f may receive the rail 212a therein, whereby a surface of the rail 212a may contact with that of the recess 221f. Therefore, by the recess 221f and the rail 212a, the first actuator 220 may be strongly coupled to the supporter 210 and moved stably. As the guide, a bearing mechanism 201 may be additionally interposed between the recess 221f and the rail 212a. The bearing mechanism 201 may include a retainer 201a interposed between the confronted surfaces of the recess 221f and the rail 212a and a bearing 201b received in the retainer 201a. The retainer 201a may include a body formed of a plate-type member and a seat formed on the body. The bearing 201b is received in the seat and may guide the motion of the first actuator 220 by contacting with the surfaces of the recess 221f and the rail 212a. Furthermore, grooves 22h and 212b may be formed on the surfaces of the recess 221f and the rail 212a in a manner of confronting each other. The bearing 201b is partially received in the grooves 221h and 212b, thereby performing rolling motion stably along the grooves 221h and 212b. Therefore, using the grooves 221h and 212b, the bearing mechanism 201 may guide the motion of the first actuator 220 more stably.

The drive unit 200 may include the second actuator 230 movably coupled to the first actuator 220. The second actuator 230 is configured to move in the first or second direction D1 or D2 against the first actuator 220. The second actuator 230 is coupled to the third frame 103 and may move the third frame 103 in the first or second direction D1 or D2. Like the slide motion of the third frame 103, considering the relevant configuration, the motion of the second actuator 230 may correspond to the slide motion. Meanwhile, as described above, as the second frame 102 is extended or retracted in a prescribed length from the first frame 102 to enlarge or reduce the front side of the mobile terminal 100, a portion of the drive unit 200 coupled to the second frame 102, i.e., the first actuator 220 may be extended or retracted in the same prescribed length from the supporter 210. On the contrary, in order to extend the display unit 151 to the front side of the extended or reduced mobile terminal 100 or withdraw the display unit 151 from the front side, the third frame 103 may be configured to move within the second frame 102 only without moving away from the second frame 102, i.e., by the distance extended or retracted by the second frame 102 exactly. Hence, the second actuator 230 coupled to the third frame 103, i.e., a portion of the drive unit 200 may move within the first actuator 230 only without moving away from the first actuator 220. Namely, the second actuator 230 may be configured to move by the extended or retracted distance of the first actuator 220 only. As described above, since the thruster 222 of the first actuator 220 has a distance corresponding to the required moving distance (i.e., the extended or retracted distance) of the second frame 102, the second actuator 230 is coupled to the thruster 222, thereby moving in the first or second direction D1 or D2 by the length of the thruster 222 within the first actuator 220.

First of all, as well shown in FIGS. 11 to 13, the second actuator 230 may include a second housing 231. The second housing 231 is movably coupled to the first actuator 220, and particularly, to the first housing 221, whereby the second actuator 230 may be made movable against the first actuator 220 overall. The first actuator 220, i.e., the first housing 221 thereof may include a guide slot 221j formed along a length direction thereof. The guide slot 221j may be formed in the cover 221b coupled to the second frame 102. Hence, the second housing 231 is received in the slot 221j and a movement of the second housing 231 may be guided by the slot 221j. Namely, the slot 221j may be configured to receive the second actuator 230 therein and guide the motion of the second actuator 230. When the second actuator 230 is coupled to the third rear part 1022 of the second frame 102, the guide slot 221j may communicate with the slot 1025 formed in the third rear part 1022. The second housing 231 may be exposed out of the second frame 102 through the slots 221j and 1025 and coupled to the third frame 103. The second actuator 230 may be coupled to the third frame 103 by the second housing 231, thereby moving the third frame 103. Lengths of the slots 221j and 1025 may correspond to the moving distance required for the second frame 102, i.e., the extended or retracted distance of the second frame 102, and further, to the length of the thruster 222. And, the second actuator 230 may reciprocate along the first or second direction D1 or D2 within the first actuator 220 by the restricted distances of the slots 221j and 1025 exactly.

Particularly, the second housing 231 may include a retainer 231a and a head 231b coupled to the retainer 231a. The retainer 231a is disposed adjacent to the thruster 222 and may be configured to couple the second actuator 230 to the first actuator 220, and particularly, to the thruster 222. The head 231b may be exposed from the second frame 102 through the slots 221j and 1025. Hence, in the second housing 231, the head 231b may be configured to be coupled to the third frame 103. The head 231b includes a fastening hole 231c and may be coupled to the third frame 103 using a fastening member and the fastening hole 231c. As well shown in FIG. 12, the second housing 231 may include a seat 231d formed on a body of the second housing 231, i.e., the head 231b and a bearing 231e disposed on the seat 231d. The seat 231d and the bearing 231e may be disposed to confront the first actuator 220, i.e., a surface of the cover 221b of the first housing 221 of the first actuator 220. The bearing 231e rolls by contacting with the cover 221b, thereby reducing the friction to enable the second actuator 230 to move smoothly relatively to the first actuator 220. The first housing 221 of the first actuator 220 may include a groove 221i formed long on the surface of the cover 221b in the length direction thereof. The bearing 231e is partially inserted in the groove 221i, thereby being guided while rolling. Hence, the second actuator 230 may move more smoothly against the first actuator 220.

The second actuator 230 may include a sub-thruster 232 received in the second housing 231. The sub-thruster 232 may have a body 232a consisting of a rod having a circular cross-section. The sub-thruster 232 may include a thread 232b formed on a surface of the body 232a. Hence, the sub-thruster 232 may include a screw gear overall like the thruster 222. The sub-thruster 232 is oriented in the second housing 231 along a length direction thereof and may be rotatably installed in the second housing 231. Namely, a center axis of the sub-thruster 232 may be oriented side by side with a center axis of the thruster 222. Particularly, the second housing 231 includes a space 231f formed in an inside thereof, and more particularly, in an inside of the head 231b, and the sub-thruster 232 may be disposed in the space 231f. The space 231f may have a shape conforming to an outer profile of the sub-thruster 232, e.g., a cylinder shape. Namely, the second housing 231 or the head 231b thereof may be configured to enclose the sub-thruster 232. As well shown in FIG. 14 and FIG. 15, the sub-thruster 232 may include a protrusion 232c elongated from both ends of the body 232a along a center axis thereof. The second housing 231 of the head 231b may include a sleeve 231i receiving the protrusion 232c rotatably. The sleeve 231i may communicate with the space 231f. Hence, by such a configuration, the sub-thruster 232 may be stably rotated within the second housing 231.

The second actuator 230, i.e., the sub-thruster 232 may be tread-coupled to the first actuator 220, i.e., the thruster 222. Particularly, the sub-thruster 232 may be directly thread-coupled to the thruster 222. Yet, as shown in FIG. 12, for more smooth movement, the sub-thruster 232 may be coupled to the thruster 222 using the bearing 231h. namely, the bearing 231h is interposed between the sub-thruster 232 and the thruster 222, thereby coupling the thrusters 222 and 232 rotatably. Particularly, the bearing 231h is partially inserted in thread bottoms between thread peaks of the sub-thruster 232 and the thruster 222, thereby rotating the adjacent sub-thruster 232 by rolling along the thread bottoms when the thruster 222 rotates. Therefore, in such a drive mechanism, the thruster 222 may become a driver and the sub-thruster 232 may become a follower. The bearing 231h may be rollably disposed in the second housing 231, i.e., the seat 231g formed on the retainer 231a thereof. The bearing 231h is partially projected from the seat 231g toward the inside and outside of the second housing 231, i.e., the sub-thruster 232 and the thruster 222, thereby being rollably coupled to the sub-thruster 232 and the thruster 222.

Referring to FIG. 12 and FIG. 13, for example, if the thruster 222 rotates in the first rotation direction R1, the supporter 210 coupled to the thruster 222 moves in the direction A along the thread of the thruster 222 by the thread coupling but the first actuator 220 having the thruster 222 may move in the first direction D1 opposite to the direction A. When the thruster 222 rotates in the second rotation direction R2, the supporter 210 may move in a direction opposite to the second direction D2 of the first actuator 220. Namely, the supporter 210 may relatively move oppositely to the moving direction of the first actuator 220. Hence, in case of being simply thread-coupled to the thruster 222, the second actuator 230 may move in a direction opposite to the first actuator 220 like the supporter 210. Yet, in order to move the third frame 102 in the same direction of the second frame 102, i.e., the first or second direction D1 or D2, the second actuator 230 should move in the same direction of the first actuator 220. Therefore, the second actuator 230 is configured to move in the same direction of the first actuator 220. For that reason, as described above, the second actuator 230 may include the sub-thruster 232 configured to move in the same direction of the first actuator 220. Particularly, the sub-thruster 232 may be configured to rotate in a direction opposite to a rotation direction of the thruster 222. If the sub-thruster 232 rotates in the direction opposite to that of the thruster 222, it may move along the thread of the thruster 222 in the same direction as the moving direction of the thruster 222. Generally, if engaging threads are wound in the same direction, they may rotate in directions counter to each other, respectively. Hence, for the counter direction rotations, the sub-thruster 232 may have the same winding direction of the thruster 222. For example, as shown in the drawing, the thruster 222 and the sub-thruster 232 may include the same right-handed threads or helixes.

Referring to FIG. 12 and FIG. 13, if the thruster 222 rotates in the first rotation direction R1, the first actuator 220 may move in the first direction D1 relatively to the supporter 210. As the second actuator 230 is carried by the first actuator 220, it may move in the first direction D12 relatively to the supporter 210. While the thruster 222 rotates in the first rotation direction R1, the sub-thruster 232 rotates in the second rotation direction R2 counter to the first rotation direction R1 and may additionally move along the thread of the thruster 222 in the first direction D1 relatively to the first actuator 220. Alternatively, if the thruster 222 rotates in the second rotation direction R2, the first actuator 220 may move in the second direction D2 relatively to the supporter 210 and the second actuator 230 may move in the second direction D2 relatively to the supporter 210 together with the first actuator 220. Moreover, the sub-thruster 232 rotates in the first rotation direction R1 counter to the second rotation direction R2 and may additionally move along the thread of the thruster 222 in the second direction D2 relatively to the first actuator 220.

As the sub-thruster 232 is linked to other components of the second actuator 230 including the second housing 231, the sub-thruster 232 may move the components of the second actuator 230 together in the first or second direction D1 or D2 while moving in the first or second direction D1 or D2 by the thread coupling to the thruster 222. Hence, the sub-thruster 232 is configured to rotate in a direction counter to a rotation direction of the thruster 222, and may be configured to thrust the second actuator 230 in the first or second direction D1 or D2 by the counter-directional rotation relatively to the first actuator 220. Moreover, as the second actuator 230 may be substantially regarded as the sub-thruster 232 itself, the second actuator 230 may be described as configured to be thread-coupled to the first actuator 220, i.e., the thruster 222 and moved in the first or second direction D1 or D2 by the rotation of the first or second rotation direction R1 or R2. Since the sub-thruster 232 corresponds to a follower dependent on the drive by the thruster 222, the first actuator 220 or the thruster 222 thereof may be described as moving the second actuator 230 or the sub-thruster 232 thereof in the first or second direction D1 or D2 by the rotation of the first actuator 220 or the thruster 222 in the first or second rotation direction from the perspective of the first actuator 220. Furthermore, as described above, the sub-thruster 232 and the second actuator 230 connected thereto may move in the first or second direction D1 or D2 against the supporter 210 as well as the first actuator 220, thereby moving a distance requested to the third frame 103 for the enlargement or reduction of the display unit 151 on the front side of the mobile terminal 100.

Moreover, as described above, the thruster 222 of the first actuator 220 is thread-coupled to the sleeve 213 of the supporter 210 and may be thread-coupled to the sub-thruster 232 of the second actuator 230 as well. Hence, if the thruster 222 rotates in the first or second rotation direction R1 or R2, the first actuator 220 moves in the first or second direction D1 or D2 against the supporter 210 and the second actuator 230 may also move in the same direction simultaneously. Namely, the thruster 222 may start to move the first and second actuators 220 and 230 simultaneously. Hence, the drive unit 200 may synchronize the movement of the second actuator 230 with the movement of the first actuator 220 by the thruster 222.

Particularly, the drive unit 200 may be configured to drive the first and second actuators 220 and 230 together using the thruster 222, which is a single drive unit, only and synchronize a timing point at which the second actuator 230 starts to move with a timing point at which the first actuator 220 starts to move. Since the second actuator 230 is located at a tip of the first actuator 230 in the first or second state, the drive unit 200 may start to move the first and second actuators 220 and 230 at the same location. Together with the synchronizations of the movement start point and the movement start location, the drive unit 200 may be configured to synchronize a moving speed of the second actuator 230 with that of the first actuator 220. For example, the thruster 222 and the sub-thruster 232 may have threads 222b and 232b having the same pitch for the movement at the same speed. Hence, during the rotation of the thruster 222 for the same time, the thruster 222 and the sub-thruster 232 may move the same distance against the supporter 210 and the thruster 222, respectively. Thus, the drive unit 200 may move the first and second actuators 220 and 230 simultaneously from the same location in the same distance and time together with the second and third frames 102 and 103 coupled thereto. As described above, since the second actuator 220 additionally moves in a prescribed distance in a manner of being carried by the first actuator 220 in the same distance, the third frame 103 connected thereto may move a required long distance. For that reason, the drive unit 200 increases or decreases the front side of the mobile terminal 100, thereby enlarging or reducing the display unit 151 on the front side according to the increase or decrease of the front side.

Based on the aforementioned configuration of the drive unit 200, an operation of the mobile terminal 100 is described in association with an operation of the drive unit 200 in detail as follows. FIG. 14 is a lateral cross-sectional view showing states of first to third frames by an operation of a drive unit in a first state and FIG. 15 is a lateral cross-sectional view showing states of first to third frames by an operation of a drive unit in a second state. In FIG. 14 and FIG. 15, the drive unit 200 is illustrated in a manner of being enlarged outside the mobile terminal to represent the correlation with the first to third frames 101 to 103 well. In FIG. 14 and FIG. 15, the coupling relations between the components of the drive unit 200 and the first to third frames 101 to 103 are denoted by dotted lines.

As shown in FIG. 14, in the first state, the second frame 102 is fully retracted in the first frame 102. Hence, only the first region 1511 of the display unit 151 fixed to the front side of the first frame 101 may be exposed to the front side of the mobile terminal 100. The third region 1513 is mostly disposed on the backside of the mobile terminal 100 together with the second region 1512 and may be partially disposed within the second frame 102 in a manner of being rolled around the roller 1028. The third frame 101 is coupled to the second region 1512 and disposed at a first point A1 on the backside of the mobile terminal 100.

In association with the disposition of the frames 101 and 102, the supporter 210 of the drive unit 200 is fixed to the first frame 101, i.e., the first front part 1011 thereof. The first actuator 220 is coupled to the second frame 102, i.e., the third rear part 1022 thereof and may be fully retracted into the supporter 210 like the second frame 102. The second actuator 230 is coupled to the third frame 103 through the second frame 102, i.e., the third rear part 1022 thereof and may be disposed at the first point A1 likewise.

In such a first state, if the second frame 102 moves in the first direction D1, the mobile terminal 100 may switch to the second state. Referring to FIG. 15, for this state switching, the first actuator 220 may start to move from the first point A1 in the first direction D1 against the first frame/supporter 101/210 together with the second frame 102 coupled thereto. As described above, since the second actuator 230 is synchronized with the first actuator 220 by the thruster 222, the second actuator 230 may start to move from the same first point A1 in the first direction D1 together with the third frame 103 simultaneously with the movement of the first actuator 220. The first actuator 220 continues to move by a first distance d1 between the first point A1 and a second point A2 relatively to the first frame 101, thereby being extended to a third point A3 as a result of such movement. Hence, the second frame 102 is moved in the first distance d1 by the first actuator 220, thereby being extended to the third point A3. As the first actuator 220 and the second frame 102 are extend to the third point A3 by the first distance d1, a second distance d2 between the second point A2 and the third point A3, i.e., an extended distance is equal to the first distance d1. While the first actuator 220 and the second frame 102 are moved and extended to the third point A3 against the first frame/supporter 101/210, the second actuator 230 and the third frame 103 move in the first distance d1 relatively to the first frame/supporter 101/210 by being carried by the first actuator 220 and may additionally move in the first direction D1 along the first actuator 220 relatively to the second frame/first actuator 102/220 simultaneously. Once the first actuator 220 and the second frame 102 complete the movement and extension to the third point A3, the second actuator 230 and the third frame 103 move from the first point A1 to the third point A3 via the second point A2, thereby further moving by the second distance d2, i.e., the extended distance of the second frame 102 in addition to the first distance d1 eventually. Namely, the second actuator 230 and the third frame 103 may move by a double of the first or second distance d1 or d2. By the movement of the second actuator 230 and the third frame 103, the third region 1513 of the display 151 may be moved to the front side of the mobile terminal 100 by the distance extended through the second frame 102, i.e., the second distance d2. Moreover, as described above, since the movement of the second actuator 230 and the third frame 103 is synchronized with the movement of the first actuator 220 and the second frame 102, the movement of the display unit 151 may be performed smoothly.

Once the second frame is fully extended in the first direction D1, the first and third regions 1511 and 1513 are disposed on the front side of the mobile terminal 100 and only the second region 1512 may be disposed on the backside of the mobile terminal 100. Hence, in the second state, the mobile terminal 100 may have the extended front display unit 151.

On the other hand, if the second frame 102 moves in the second direction D2 in the second state, the mobile terminal 100 may return to the first state of FIG. 14 from the second state of FIG. 15. For this state switching, the first actuator 220 starts to move from the third point A3 in the second direction D2 together with the second frame 102 coupled thereto relatively to the first frame/supporter 101/210. Simultaneously with the movement of the first actuator 220, the second actuator 230 may start to move from the same third point A3 in the second direction D2 together with the third frame 103. The first actuator 220 continues to move by the second distance d2 between the third point A3 and the second point A1 relatively to the first frame 101, thereby being retracted to the first point A1 as a result of such movement. Hence, the second frame 102 is moved in the second distance d2 by the first actuator 220, thereby being retracted to the first point A1. While the first actuator 220 and the second frame 102 are moved and retracted to the first point A1 against the first frame/supporter 101/210, the second actuator 230 and the third frame 103 move the second distance d2 relatively to the first frame/supporter 101/210 by being carried by the first actuator 220 and may additionally move in the second direction D2 relatively to the second frame/first actuator 102/220 along the first actuator 220 simultaneously. Once the first actuator 220 and the second frame 102 complete the movement and retraction to the first point A1, the second actuator 230 and the third frame 103 move to the first point A1 from the third point A2 via the second point A2, thereby further moving the first distance d1, i.e., the retracted distance of the second frame 102 in addition to the second distance d2 eventually. Namely, the second actuator 230 and the third frame 103 may move a double of the first or second distance d1 or d2. By such movement of the second actuator 230 and the third frame 103, the third region 1513 of the display unit 151 may return to the backside of the mobile terminal by the distance retracted through the second frame 102, i.e., the first distance d1. Moreover, as the movement of the second actuator 230 and the third frame 103 and the movement of the first actuator 220 and the second frame 102 are synchronized with each other, the movement of the display unit 151 may be performed smoothly. If the second frame 102 is fully retracted in the second direction D2, it may be switched to the first state described in the foregoing description.

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A mobile terminal, comprising:
a first frame;
a second frame movably accommodated within the first frame and configured to be moved in a first direction relative to the first frame to slide out from the first frame;
a third frame movably accommodated within the second frame and configured to be moved in the first direction relative to the second frame to slide out from the first and second frames;
a flexible display comprising:
a first region disposed on a front side of the mobile terminal and coupled to the first frame;
a second region disposed on a backside of the mobile terminal and coupled to the third frame, the second region being entirely exposed externally outside the mobile terminal; and
a third region elongated between the first and second regions,
wherein the third region is configured to be disposed on the front side or a backside of the mobile terminal while being exposed externally outside the mobile terminal based on a moving direction of the second frame causing the third region to be rolled around the second frame; and
a drive unit configured to:
move the second and third frames relative to the first and second frames, respectively, in the first direction, to switch the mobile terminal from a first state to a second state, wherein only the first region, among the first, second, and third regions of the flexible display, is exposed externally to the front side of the mobile terminal in the first state, and wherein only the first and third regions are exposed externally to the front side of the mobile terminal in the second state; and
pull out the third region from the backside of the mobile terminal toward the front side of the mobile terminal through the second frame by moving the second and third frames in the first direction, such that the mobile terminal is switched to the second state.

2. The mobile terminal of claim 1, wherein the second frame and the third frame are further configured to be moved in a second direction opposite the first direction such that the second frame slides horizontally into the first frame and the third frame slides horizontally into the first and second framed, and
wherein the drive unit is further configured to:
move the second and third frames relative to the first and second frames, respectively, in the second direction to switch the mobile terminal to the first state from the second state; and
retract the pulled out third region from the front side of the mobile terminal to the backside of the mobile terminal through the second frame by moving the second and third frames in the second direction, such that the mobile terminal is switched to the first state.

3. The mobile terminal of claim 1, wherein the drive unit is further configured to:
synchronize the movement of the third frame with the movement of the second frame; and
synchronize a location for the third frame to start to move with a location for the second frame to start to move.

4. The mobile terminal of claim 3, wherein the drive unit is further configured to synchronize a timing point for the third frame to start to move with a timing point for the second frame to start to move.

5. The mobile terminal of claim 3, wherein the drive unit is further configured to synchronize a moving speed of the third frame with a moving speed of the second frame.

6. The mobile terminal of claim 1, wherein the drive unit comprises:
a supporter coupled to the first frame;
a first actuator coupled to the supporter so as to be movable in the first direction and coupled to the second frame; and
a second actuator coupled to the first actuator so as to be movable in the first direction and coupled to the third frame.

7. The mobile terminal of claim 6, wherein the drive unit is further configured to synchronize a movement of the second actuator with a movement of the first actuator.

8. The mobile terminal of claim 6, wherein the supporter comprises sidewalls configured to confront both sides of the first actuator and support a movement of the first actuator.

9. The mobile terminal of claim 6, wherein the first actuator is thread-coupled to the supporter and configured to be moved in the first direction relative to the supporter when the first actuator is rotated in a first rotation direction.

10. The mobile terminal of claim 6, wherein the first actuator comprises:
a first housing movably coupled to the supporter; and
a thruster thread-coupled to the supporter within the first housing,
wherein the thruster is configured to thrust the first actuator in the first direction relative to the supporter by being rotated in a first rotation direction.

11. The mobile terminal of claim 10, wherein the thruster comprises:
an elongated body; and
a screw gear having a thread formed on an outer surface of the body.

12. The mobile terminal of claim 10, wherein the first actuator further comprises a motor disposed within the first housing and configured to rotate the thruster.

13. The mobile terminal of claim 6, wherein:
the drive unit further comprises a guide configured to guide movement of the first actuator relative to the supporter; and
the guide comprises:
a rail protruding from the supporter toward the first actuator and elongated in a length direction of the supporter; and
a recess formed on the first actuator along a length direction of the first actuator and configured to receive the rail.

14. The mobile terminal of claim 13, wherein the guide further comprises:
a retainer interposed between confronted surfaces of the recess and rail; and
a bearing received in the retainer and contacting the surfaces of the recess and rail.

15. The mobile terminal of claim 9, wherein the second actuator is thread-coupled to the first actuator and configured to be moved in the first direction when the first actuator is rotated in the first rotation direction.

16. The mobile terminal of claim 10, wherein the thruster is further configured to move the first and second actuators simultaneously by being rotated in the first rotation direction.

17. The mobile terminal of claim 10, wherein the thruster is thread-coupled to the second actuator.

18. The mobile terminal of claim 10, wherein the second actuator comprises:
a second housing movably coupled to the first actuator; and
a sub-thruster rotatably disposed within the second housing and thread-coupled to the thruster,
wherein the sub-thruster is configured to:
rotate in a second rotation direction opposite the first rotation direction when the thruster rotates in the first rotation direction; and
thrust the second actuator in the first direction by being rotated in the second rotation direction.

19. The mobile terminal of claim 18, wherein a thread of the sub-thruster has a rolling direction that is same as a rolling direction of a thread of the thruster.

20. The mobile terminal of claim 10, wherein the first actuator further comprises a guide slot formed along a length direction of the first actuator, the guide slot guiding a motion of the second actuator by receiving the second actuator therein.

* * * * *